(12) United States Patent
Lal et al.

(10) Patent No.: US 12,732,469 B2
(45) Date of Patent: Sep. 8, 2026

(54) QUEUE PROTECTION WITH SELECTIVE L4S USE

(71) Applicant: Adeia Guides Inc., San Jose, CA (US)

(72) Inventors: Dhananjay Lal, Englewood, CO (US); Christopher Phillips, Hartwell, GA (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 79 days.

(21) Appl. No.: 18/806,438

(22) Filed: Aug. 15, 2024

(65) Prior Publication Data

US 2026/0052112 A1 Feb. 19, 2026

(51) Int. Cl.
*H04L 47/6275* (2022.01)
*H04L 47/62* (2022.01)

(52) U.S. Cl.
CPC ...... *H04L 47/6275* (2013.01); *H04L 47/6235* (2013.01)

(58) Field of Classification Search
None
See application file for complete search history.

(56) References Cited

U.S. PATENT DOCUMENTS

2008/0297312 A1* 12/2008 Moshfeghi .......... H04L 47/2433 340/10.1

OTHER PUBLICATIONS

The DOCSIS(r) Queue Protection Algorithm to Preserve Low Latency draft-briscoe-docsis-q-protection-07 (Year: 2023).*

Briscoe, B., et al., "Low Latency, Low Loss, and Scalable Throughput (L4S) Internet Service: Architecture RFC 9330", Internet Engineering Task Force (IETF), available online at: <https://datatracker.ietf.org/doc/rfc9330/>, Dec. 12, 2023, 36 pages.

Briscoe, B., et al., "The DOCSIS(r) Queue Protection Algorithm to Preserve Low Latency", draft-briscoe-docsis-q-protection-07, available online at: <https://datatracker.ietf.org/doc/draft-briscoe-docsis-q-protection/>, Nov. 23, 2023, 37 pages.

Ericsson, "Enabling time-critical applications over 5G with rate adaptation", available online at: <https://www.ericsson.com/49bc82/assets/local/reports-papers/white-papers/26052021-enabling-time-critical-applications-over-5g-with-rate-adaptation-whitepaper.pdf>, May 2021, 21 pages.

(Continued)

*Primary Examiner* — Tonia L Dollinger
*Assistant Examiner* — Ishrat Rashid
(74) *Attorney, Agent, or Firm* — HG LAW LLP

(57) ABSTRACT

Use of a preferential resource, such as a Low Latency, Low Loss, and Scalable Throughput queue of a device, may be selectively enabled based on past resource-requesting behavior of a sending application. A characteristic, such as an Explicit Congestion Notification bit, of network traffic transmitted by a sending application is detected during a data traffic congestion condition at a receiving network node. If this characteristic indicates a request for processing via a preferential queue, then a prior network traffic transmission profile of the sending application may be identified, based on which it is determined whether the sending application has not, within a threshold time period, previously transmitted prior network traffic that indicated a prior request for the processing via the preferential queue. Accordingly, access to the preferential queue may be granted, or may be made more likely, for data packets of the current network traffic of the sending application.

17 Claims, 15 Drawing Sheets

(56) References Cited

OTHER PUBLICATIONS

Schepper, K. DE., et al., "Dual-Queue Coupled Active Queue Management (AQM) for Low Latency, Low Loss, and Scalable Throughput (L4S)", Internet Engineering Task Force (IETF), available online at: <https://datatracker.ietf.org/doc/html/rfc9332>, Jan. 2023, 52 pages.

Schepper, K. DE., et al., "The Explicit Congestion Notification (ECN) Protocol for Low Latency, Low Loss, and Scalable Throughput (L4S)", RFC 9331, available online at: <https://datatracker.ietf.org/doc/rfc9331/>, Jan. 2023, 52 pages.

U.S. Appl. No. 18/667,655, filed May 17, 2024, title: Intelligent Application Priority Packet Delivery Control.

U.S. Appl. No. 18/744,496, filed Jun. 14, 2024, title: Dynamic Systems and Methods for Media-Aware Low-to Ultralow-Latency, Real-Time Transport Protocol.

U.S. Appl. No. 18/744,547, filed Jun. 14, 2024, title: Dynamic Systems and Methods for Media-Aware Transport of Fragment of Content in Low-Latency, Over-The-Top, and Adaptive Bitrate Streaming.

White, G., et al., "Low Latency DOCSIS: Technology Overview", CableLabs (Registered), available online at: <https://account.cablelabs.com/server/alfresco/0affb960-25f4-44f9-b747-74ad8555fd06>, 2019, 21 pages.

* cited by examiner

| Binary Codepoint | Codepoint Name | Meaning |
| --- | --- | --- |
| 00 | Non-ECT | Not ECN-Capable Transport |
| 01 | ECT (1) | L4S-Capable Transport |
| 10 | ECT (0) | ECN-Capable Transport |
| 11 | CE | Congestion Experienced |

FIG. 4

```
<CODE BEGINS>
    if ( (qdelay > CRITICALqL) // Test if qdelay over threshold...
       // ...and if flow's q'ing score scaled by qdelay/CRITICALqL
       // ...exceeds CRITICALqLSCORE_Flow_Adjusted
       && (qdelay * qLscore > CRITICAL@LPRODUCT ) )
       // qLscore is reduced using the described method

<CODE ENDS>
```

FIG. 7

```
<CODE BEGINS>
// Input Parameters
MAX_RATE;             //Configures maximum sustained rate [b/s]
QPROTECT_ON;          //Queue Protection is enabled [Default: TRUE]
CRITICALqL_us;        //L queue threshold delay [us] Default: MAXTH_us
CRITICALqLSCORE_us;//The threshold queuing score [Default: 4000us]
LG_AGING;            //The aging rate of the q'ing score [Default: 19]
                     //as log base 2 of the congestion-rate [lg(B/S)]

// Input Parameters for the calcProbNative() algorithm:
MAXTH_us;            //Max IAQM markingthreshold [Default: 1000us]
LG_RANGE;            //Log base 2 of the range of rmp [lg(ns)]
                     //Default: 2^19 = 524288 ns (roughly 525 us)

<CODE ENDS>
```

FIG. 8

```
<CODE BEGINS>
// Constants, either derived from input parameters or hard-coded
T_RES;                        // Resolution of t_exp [ns]
                         // Convert units (approx)
AGING = pow(2, (LG_AGING-30)) * T_RES; //lg([B/s]) to [B/T_RES]
CRITICALqL = CRITICALqL_us * 1000;    // [us] to [ns]
CRITICALqLSCORE = CRITICALqLSCORE_US * 1000/T_RES; // [us] to [T_RES]
beta_qLScore = 0; // initialize beta QL score to 0 for initialization, beta_qLScore is
used in dynamically adjusting the CRITICALqLPRODUCT allowing for the credit

// Threshold for the q'ing score condition
CRITICALqLPRODUCT = CRITICALqL* CRITICALqLSCORE;
qLSCORE_MAX = 5E9 / T_RES;     // Max queuing score = 5 s

ATTEMPTS = 2; // Max attempts to pick a bucket (vendor-specific)
BI_SIZE = 5; // Bit-width of index number for non-default buckets
NBUCKETS = pow(2, BI_SIZE); // No. of non-default buckets
MASK = NBUCKETS-1;   // convenient constant, with BI_SIZE LSBs set

           // Queue Protection exit states
EXIT_SUCCESS = 0;   // Forward the packet
EXIT_SANCTION = 1;  // Redirect the packet

MAX_PROB    = 1; // For integer arithmetic, would use a large int
       //e.g., 2^31, to allow space for overflow
```

FIG. 9A

```
MAXTH = MAXTH_us * 1000;  // Max marking threshold [ns]
MAX_FRAME_SIZE = 2000; // DOCSIS-wide constant [B]
//Minimum marking threshold of 2 MTU for slow links [ns]
FLOOR = 2 * 8* MAX_FRAME_SIZE * 10^9 / MAX_RATE;
RANGE = (1 << LG_RANGE); // Range of ramp [ns]
MINTH = max (MAXTH - RANGE, FLOOR);
MAXTH = MINTH + RANGE;      // Max marking threshold [ns]

<CODE ENDS>
```

FIG. 9B

```
<CODE BEGINS>
// Per packet queue protection
qprotect (packet, ...){

bckt_id;  // bucket index
qLscore;  // queuing score of pkt's flow in units of T_RES

qdelay = qL.qdelay(...);
probNative = calcProbNative(qdelay);

bckt_id = pick_bucket(packet.uflow);
qLscore = fill_bucket(buckets[bckt_id], packet.size, probNative);

 beta_qLScore = updateBetaScore(qLScore); updataBetaScore could be calculating mean, median or another
possible calculation of packets in the queue for credit adjustment.

 CRITICALqLPRODUCT = CRITICALqL* (CRITICALqLSCORE + | CRITICALqLSCORE - beta_qLScore|)//Calculate a new
CRITICALqLPRODUCT possibly giving credit for previous packets good behavior.

// Determine whether to sanction packet
if ( ( ( qdelay > CRITICALqL) // Test if qdelay over threshold...
   // ...and if flow's q'ing score scaled by qdelay/CRITICALqL
   // ...exceeds CRITICALqLSCORE
   && (qdelay * qLscore > CRITICALqLPRODUCT ))
   // or qLSCORE_MAX reached
   || (qLscore >= qLSCORE_MAX))

   return EXIT_SANCTION;

 else

  return EXIT_SUCCESS;
}
<CODE ENDS>
```

FIG. 9C

```
<CODE BEGINS>
 if ( ( qdelay > CRITICALqL) // Test if qdelay over threshold...
   // ...and if flow's q'ing score scaled by qdelay/CRITICALqL
   // ...exceeds CRITICALqLSCORE Flow_Adjusted
   && (qdelay * qLscore > CRITICALqLPRODUCT))

   // This check is the same however Now CRITICALlPRODUCT is adjusted based on previous packets behavior in the earlier adjustment CRITICALLPRODUCT = CRITICALL * (CRITICALLSCORE + |CRITICALALSCORE -
beta_qLScore|) |

<CODE ENDS>
```

FIG. 9D

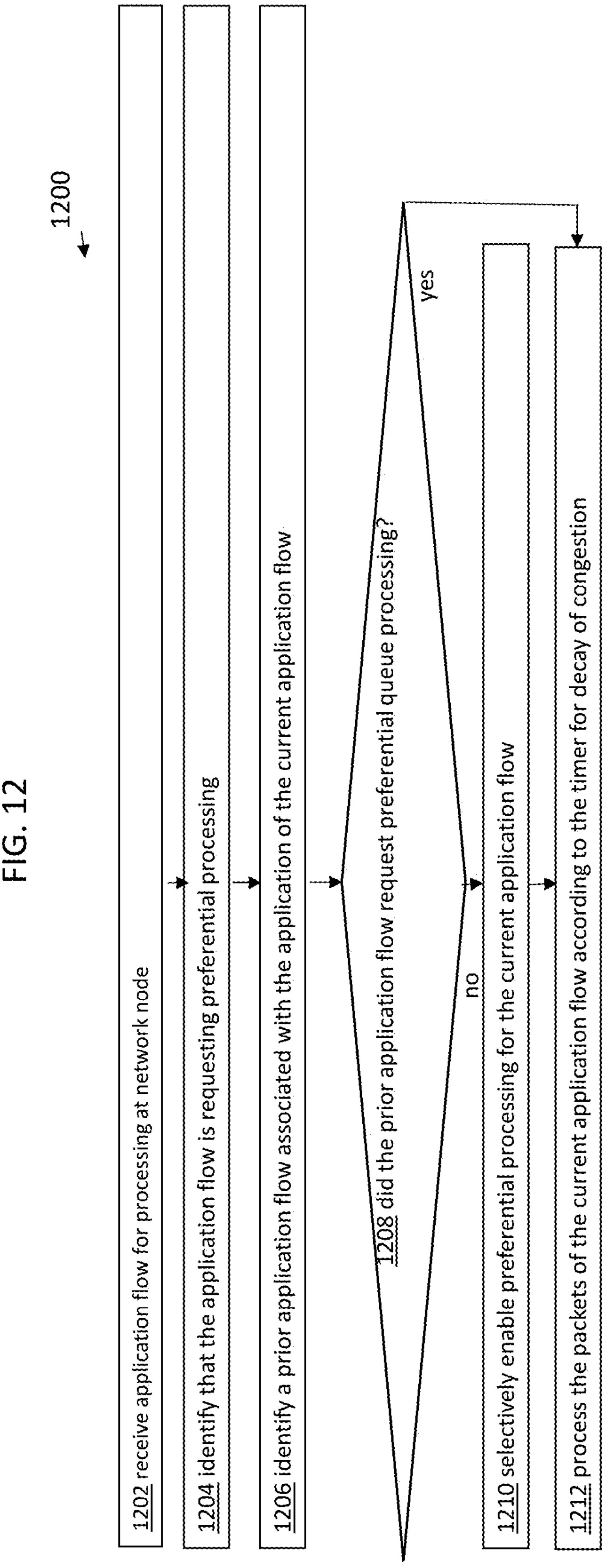
FIG. 12
1200
1202 receive application flow for processing at network node
1204 identify that the application flow is requesting preferential processing
1206 identify a prior application flow associated with the application of the current application flow
1208 did the prior application flow request preferential queue processing?
yes
no
1210 selectively enable preferential processing for the current application flow
1212 process the packets of the current application flow according to the timer for decay of congestion

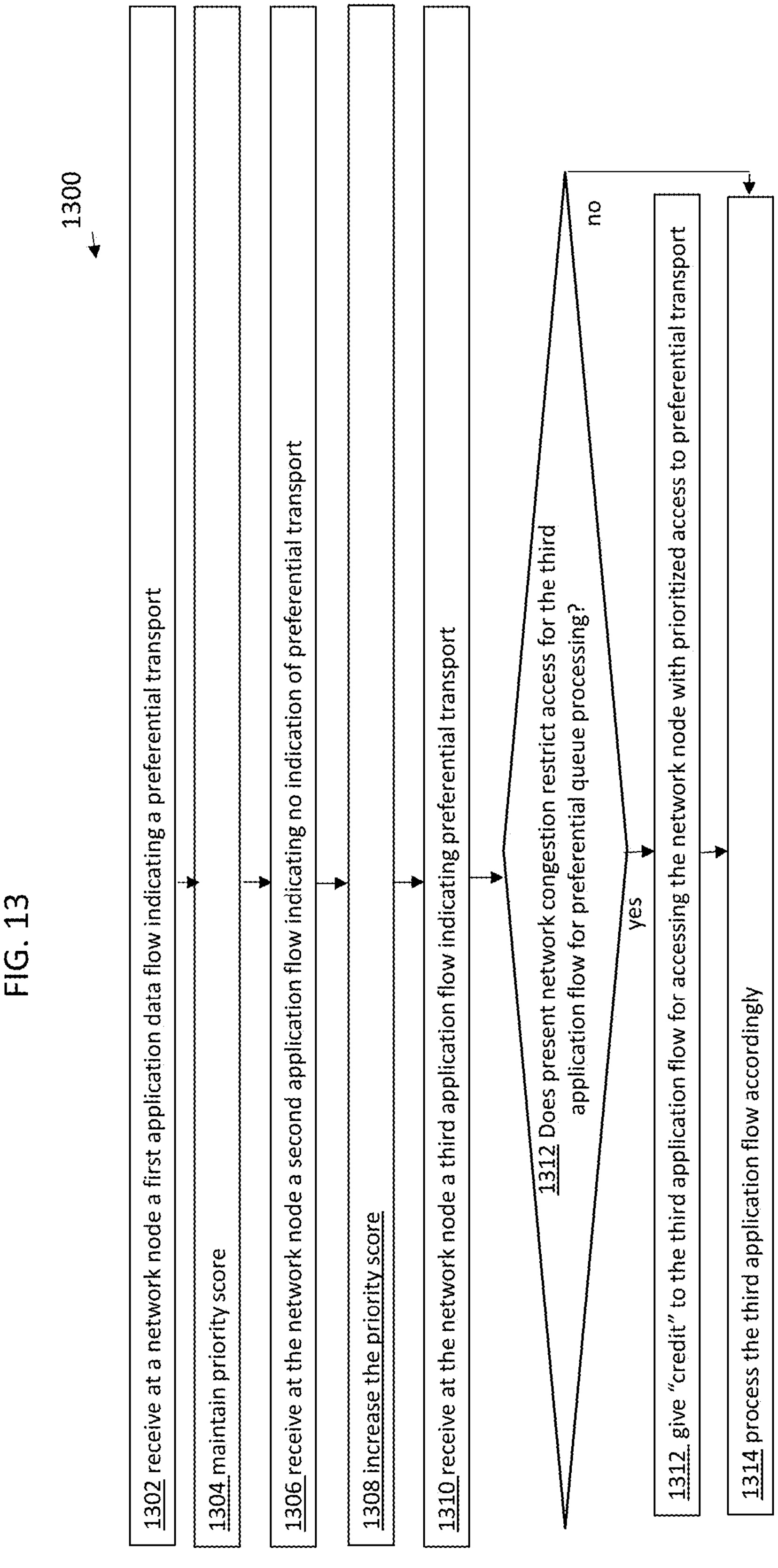
FIG. 13
1300
1302 receive at a network node a first application data flow indicating a preferential transport
1304 maintain priority score
1306 receive at the network node a second application flow indicating no indication of preferential transport
1308 increase the priority score
1310 receive at the network node a third application flow indicating preferential transport
1312 Does present network congestion restrict access for the third application flow for preferential queue processing?
no
yes
1312 give "credit" to the third application flow for accessing the network node with prioritized access to preferential transport
1314 process the third application flow accordingly

QUEUE PROTECTION WITH SELECTIVE L4S USE

FIELD OF THE DISCLOSURE

The present disclosure relates to content delivery, including low- to ultralow-latency content delivery via real-time transport protocol (RTP).

SUMMARY

When a network link is congested, for example at the "last mile" of data traffic before delivery to a client device, latency on the network link may increase during heavy traffic. Traditional single-queue buffering of Internet packets at a network component, such as an access network router, suffers from Head-of-Line (HoL) blocking. This may cause high latency-sensitive traffic to wait in a queue behind less latency-sensitive traffic, which adversely affects the customer's quality of experience (QoE).

Some congestion control mechanisms utilized by a sender transmitting data on the network link sometimes exacerbate the congestion problem. Congestion control mechanisms sometimes attempt to detect currently available capacity on the network link, to allow the sender to adjust its data transmission rate accordingly. In one approach, RFC 9330 introduces the Low Latency, Low Loss, Scalable Throughput (L4S) service, addressing latency issues in high bit-rate networks. It identifies queueing delay as a performance degrader, occurring when large capacity-seeking flows, such as TCP or interactive video, run alongside user traffic. L4S uses dual queueing in the WAN or LAN, dedicating one queue to low latency traffic and another to classic traffic, aiming to improve network-dependent applications' performance. The approach is based on the idea that queueing delay's root cause lies in the capacity-seeking congestion controllers of senders, not the queue itself. L4S encourages transitioning from congestion control algorithms causing substantial queueing delay to controls seeking capacity with minimal queueing, aided by a modified form of Explicit Congestion Notification (ECN).

However, the L4S approach has limitations. It assumes all applications will transition to the new congestion controls, which may not be feasible due to legacy systems and compatibility issues. It also assumes applications will not attempt to send all traffic to the L4S queue. Further, the dual queueing system causes resource allocation challenges thus impacting the performance of classic traffic.

In the L4S approach, some network traffic, for example, some video game traffic or XR network traffic, may be processed in a preferential manner. The non-preferential queue may be sufficient for much of the network traffic without impacting the QoE, thus not causing suboptimal use of network resources. For example, portions of the network traffic such as a menu, advertisement, or cutscene of a video game, may be less likely to impact the user experience. By adding data that does not require low-latency treatment to the non-preferential queue, network resources (e.g., latency priority) may be conserved for data that will have the most impact on the user experience (e.g., combat portions of a video game).

For purposes of illustration, packets associated with a network traffic flow may be recognized based on a 5-tuple, for example, source IP address/port number, destination IP address/port number and the protocol in use determination as to one or more of the above described time period, data quantity or percentage may be application dependent. An explicit congestion notification (ECN) bit may be used to signal a request for a low latency queue.

However, if applications repeatedly request the low latency queue for network traffic flows even when low latency is not required, then the low latency queue may become congested. While L4S attempts to do justice to highly latency-sensitive applications, it does not provide for incentivizing preferential queue requests only for data that needs it, or for explicitly imposing a penalty for preferential queue requests for data that does not need it.

To help address the limitations and problems of these and other approaches, according to an aspect of the disclosure, in some embodiments, a queue assigner may maintain a record of previous preferential queue requests by an application for processing by a network node. For example, state data associated with an application flow is determined by a network node. The queue assigner associated with a network may utilize the state data to determine whether preferential treatment should be applied to the application flow. The queue assigner may be located at a (or implemented as part of a) device such as a cable modem (CM) in the upstream with respect to data being uploaded, and/or with respect to data being downloaded, may be located at (or implemented as part of) a cable modem termination system CMTS, base station of a cellular network, BNG (broadband gateway) or the like. Such a device may sometimes be referred to as the network node or receiving device. Thus, the application that sends traffic may be upstream or downstream of the network node for which prioritized queueing is to be decided. The terms "application," "sending application," or "sender application" may also refer to a server (e.g., an application server) that provides a data flow (e.g., downstream traffic). For the processing for the network node or receiving device, a decision has to be made as to whether a packet should be added to the preferential queue (sometimes referred to as "LL," "low latency," or "L4S queue") or to the non-preferential queue (sometimes referred to a "classic queue").

If the application is currently requesting processing by a network node using the preferential queue for its network traffic, the queue assigner may grant preferential status to a flow of network traffic associated with the requesting application only if one or more conditions for prior requests for preferential queue use of the application is satisfied. For example:

- the queue assigner may grant the preferential status for the flow of network traffic only if the application requested no preferential queue request within a threshold look-back time period, for example, about 0.001 to about 30 seconds, or about 0.000,001 to 90 seconds;
- the queue assigner may grant the preferential status for the flow of network traffic only if the application requested less than a threshold amount of data, for example, preferential queue request(s) are for no more than a percentage, for example, about 20%-65% of the application's current total network data traffic (or request for traffic delivery) for processing by the network node, or no more than a specified number of packets, for example, about 1,024 to 65,536 packets, within the threshold look-back time period;
- the queue assigner may grant the preferential status for the flow of network traffic only if the application's preferential queue request(s) is for no more than a percentage, for example, about 20%-65%%, or about 5%-98%, of its total network traffic requests for processing by the network node;
- the queue assigner may grant the preferential status for the flow of network traffic only if, based on a combination of more than one of the factors of the above examples (e.g., [(no more than a percentage) AND (no more than a threshold amount)], [(no more than a percentage) OR (no more than a threshold amount)]), criteria are met. For example, if a sending application requested L4S queue processing, within a threshold period of time, for example, within about 10-15 seconds, or within about 0.001-90 seconds, for no more than a threshold percent, by way of illustration about 10-15% or 3-50%, of its data flows, then it may receive "credit" for its current data flow.

In an embodiment, an application that judiciously or selectively uses LAS may get some credit as a reward for its avoidance of the precious L4S queue resource. This credit may be applied to a subsequent data flow associated with the application. The credit may be in the form of a reduction in the queueing score of the subsequent data flow during a burst arrival, or a shortening of the decay time of the queueing score. When the application requests use of the L4S queue because of a traffic burst, then this credit (i.e., reduction of the queueing score or hastening the time of its deemed demise) works to its advantage by calculating faster expiry for congestion ascribed to the data flow associated with the application. In this way, a packet from another data flow may be chosen for ejection from the L4S queue rather than a packet from the data flow associated with the application that has selectively used L4S in the past. U.S. application Ser. No. 18/744,496, DYNAMIC SYSTEMS AND METHODS FOR MEDIA-AWARE LOW-TO ULTRA-LOW LATENCY, REAL-TIME TRANSPORT PROTOCOL CONTENT DELIVERY, and U.S. application Ser. No. 18/667,655, INTELLIGENT APPLICATION PRIORITY PACKET DELIVERY CONTROL, are incorporated in full by reference herein.

The amount of credit received by a data flow for past non-resource grabbing behavior of the sending application may be proportional to the past behavior. For example, the queue assigner may grant the preferential status for a quantity of data packets from the sender in the current data flow based on the quantity or percentage of packets in the most recent data flow of the sender that did not request L4S queue processing, or based on the quantity or percentage of packets in one or more data flows of the sender within a past period of time that did not request L4S queue processing.

The preferential status granted, may be in the form of reducing a queueing score decay timer, automatically being added to the L4S queue, or one or more of the other rewards discussed herein. For example, a database accessed by a queue assigner device or module may keep track of how many packets associated with a sending application have been given credit over a period of time, what percentage of packets associated with a sending application have been given credit over a period of time, how many packets of a data flow have been given credit, over a period of time, and/or what percentage of packets associated with a data flow have been given credit over a period of time.

In some embodiments, if one or more of the prior preferential queue request conditions is met, then the queue assigner may grant the preferential status for the flow of network traffic, which may be thought of as a kind of credit to the application's current request for the preferential queue The preferential status for the request may take the form of the queue assigner reducing a timer expiration value for the congestion. In this way, requests for preferential queue processing of network traffic for this application would be given preference over those of other applications because a queueing score for the network traffic of this application would be given a lower value, or a queueing score value with a faster expiration time. The queueing score may be a value that indicates, approximates or serves as a proxy for a level of network traffic congestion for processing by the network node. For example, the queueing score may be calculated as:

$$\text{(the rate of data flow)} \times \text{(the level of congestion)}$$

where both the rate of data flow and the level of congestion is measured at the instant each packet of the data flow arrives.

In an embodiment, if the queueing score is zero or below a threshold then all requested preferential queue requests may be granted since there is likely no congestion for processing by the network node.

In some embodiments, further limitations may be imposed on the "credit" given to the current application flow based on prior application flow(s). The queue assigner may limit the granting of the credit for preferential status of the current application data flow based on several factors. For example, the length of the look-back time period—the period during which resource-grabbing behavior of prior application flows is assessed—may be set depending on the value of the queueing score. As discussed, the queueing score may reflect, or serve as an approximation or proxy for, the amount of congestion at the network node that is created/caused by a particular application flow Accordingly, the queue assigner may lengthen the look-back period if the queueing score is high, making it more difficult to receive preferential treatment of the data flow.

In some embodiments, an application provider may provide network traffic flows associated with two or more applications flows (e.g., each data flow may be distinguished by its respective 5-tuple). For example, more than one application may be running between a source and a destination IP (even if port numbers and protocol field are different). By way of illustration, this may occur if a server is providing cloud gaming service and another service such as chat/messenger. In such situations, a network service provider may transfer the credits of one flow to another flow—credit accrued to a first application flow for requesting no preferential queue processing within a threshold time may be applied to a data flow sent by a second application. When a voice chat selectively uses LAS, the "credit" for non-resource grabbing behavior may be transferred to cloud gaming. In this example, a burst in cloud gaming traffic may benefit from infrequent (selective) use of L4S by the voice chat. The network node may implement this by comparing the source and destination IP addresses of different flows that are active (based on the macro timer) at any time.

In some embodiments, determining whether to provide the portion of the application flow to the network node using the preferential queue or the classic queue may also take into consideration a bandwidth of the network and a jitter associated with providing the portion of the data traffic over the network, as well as a traffic processing capacity of the network node.

A method, system, apparatus, non-transitory computer-readable medium, and means for implementing the method are disclosed for selectively enabling use of preferential resource based on past resource-requesting behavior. A method may include, for instance, by way of illustration: detecting a characteristic of network traffic transmitted by an application, wherein the characteristic indicates a request for processing via a preferential queue; identifying a prior network traffic transmission profile of the application; based at least on the prior network traffic transmission profile of the application, determining that the application has not, within a threshold time period, previously transmitted prior network traffic that indicated a prior request for the processing via the preferential queue; and based at least on the determining that the application has not, within the threshold time period, previously transmitted the prior application data flow that indicated the request for the processing via the preferential queue, providing the network traffic to the network node using the preferential queue. For example, the characteristic of network traffic transmitted by the application may be a request for expedited processing by the \ network node via the L4S queue. This request may be detected, for example, based on ECN bits of data packets of the network traffic. One or more of the operations of such a method may be performed by the device that is the network node itself as part of its queue management.

Such a method may also include: based on the determining that the application has not, within the threshold time period, previously transmitted the prior network traffic that indicated the request for the processing via the preferential queue: computing a queueing parameter indicating a queue congestion for processing by the network node, and adjusting the queueing parameter to enable the providing the data to the network node using the preferential queue.

For example, this queueing parameter may be a queueing score calculated based on a combining (e.g., multiplying) a rate of flow of the data provided to the network node via the network and a level of congestion for processing by the network node. The adjusting the queueing parameter may entail changing a decay time of the queueing score. This may be performed using a decay timer that approximates how long it will take the congestion to dissipate at this network node. The queueing score may be computed in other ways, for example, based on the number of packets that have been received per unit of time, or the number of packets that are in one or more queues awaiting processing.

In such a method, a queueing parameter may be computed, which indicates congestion for processing by the network node, and the threshold time period may be adjusted based on the queueing parameter such that a longer threshold time period is selected when the computing of the queueing parameter indicates a more severe queue congestion.

The preferential queue may be an LAS queue or other type of low latency queue, and the network traffic transmitted by the application may be a data flow comprising data packets. The characteristic of the network traffic transmitted by the application may be detected by accessing an Explicit Congestion Notification control bit of packets of the data flow.

A queue assigner, a device separate from or integrated with the network device that processes the data flow, may determine that the application has not, within the threshold time period, previously transmitted network traffic that indicated a prior request for the processing via the preferential queue. For example, the queue assigner may be part of, or may be at, one of a cable modem termination system (CMTS), a cable modem (CM), a base station (BS) of a cellular network or a Broadband Network Gateway (BNG) of a digital subscriber line (DSL) network.

The data transmitted by the application may include video data or game rendering data.

Also contemplated is a computer-implemented method that may include, for example, identifying that a network traffic flow associated with a sender and provided via a network to a network node requested preferential queue processing; determining that a previous application data flow associated with the application and provided to the network node requested default queue processing; based at least on the determining that the previous application flow associated with the sender provided to the network node was default queue requesting, selectively enabling use of the preferential queue by directing the network traffic flow to the preferential queue of the network node.

Also described is a method for low-latency to ultralow-latency content delivery that may entail, by way of illustration: for at least one application source or sender: based at least in part on receiving an indication of selective preferential transport of a first image unit, maintaining a priority score for the preferential transport. Based at least in part on receiving no indication of selective default transport of the first image unit, increasing the priority score; and subsequently, for the at least one source or sender: determining that present network congestion restricts access to the preferential transport of a second image unit, prioritizing preferential transport of the second image unit based at least in part on the priority score.

In addition, disclosed is a method for low latency content delivery. Such a method may include: for at least one source or sender: based at least in part on receiving an indication of selective preferential transport of a first fragment of a segment of content, decreasing a priority score for the preferential transport. Based at least in part on receiving no indication of the selective preferential transport of the first fragment of the segment of the content, increasing the priority score; and subsequently, for the at least one source or sender: determining that present network congestion restricts access to the preferential transport of a second fragment, and prioritizing preferential transport of the second fragment based at least in part on the priority score.

The present invention is not limited to the combination of the elements as listed herein and may be assembled in any combination of the elements as described herein. These and other capabilities of the disclosed subject matter will be more fully understood after a review of the following figures, detailed description, and claims.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

The embodiments herein may be better understood by referring to the following description in conjunction with the accompanying drawings in which like reference numerals indicate identically or functionally similar elements, of which:

FIG. 4 shows an example of Explicit Congestion Notification (ECN) bits of a header portion of a data packet that may be used to detect a request for preferential queue processing, in accordance with an aspect of some embodiments of the present disclosure;

FIG. 7 shows pseudocode for quantifying network traffic congestion and its decay, in accordance with an aspect of some embodiments of the present disclosure;

FIG. 8 shows variables that may be used for pseudocode described, in accordance with an aspect of some embodiments of the present disclosure;

FIGS. 9A-9D shows pseudocode for determining whether to assign data traffic to the preferential queue or to the non-preferential queue, in accordance with an aspect of some embodiments of the present disclosure.

FIG. 12 is a flowchart showing processing for selective enablement of preferential processing of application traffic in accordance with an aspect of some embodiments of the present disclosure.

FIG. 13 is a flowchart showing processing for assigning credit to a third application flow in accordance with an aspect of some embodiments of the present disclosure.

The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting exemplary embodiments and that the scope of the present invention is defined solely by the claims.

DETAILED DESCRIPTION

Network traffic is controlled in a manner that provides preferential processing as a reward for requests made in a particular manner. For example, if one application flow has not recently requested prioritized processing from a network, when the application later makes a request for prioritized processing, it may be more likely to be granted. Also, for example, if a network node is busy, only an application data flow from an application that has not recently requested prioritized processing may be granted prioritized processing. In some implementations, each application data flow may be scored based on request frequency and levels of network congestion. For example, the credit may be applied in the form of the application data flow being processed more quickly despite network congestion. The decision may be made by a specific network node part. The applications that send the data may vary, for example the applications may be video or games. Further, for example, all data sent by all types of applications may be given a turn for quick processing so as to avoid preferential treatment of any one application type. If application data flows associated with an application usually do not request preferential processing but sends a request for prioritized processing for a particularly large data chunk, the credit may decrease for future data sent by the application. If the application sends a request indicating that normal processing is acceptable, its credit may increase for future data sent by the application or device. When the network is busy, for example, such credit may be used to decide which data is processed preferentially.

Figure 1:
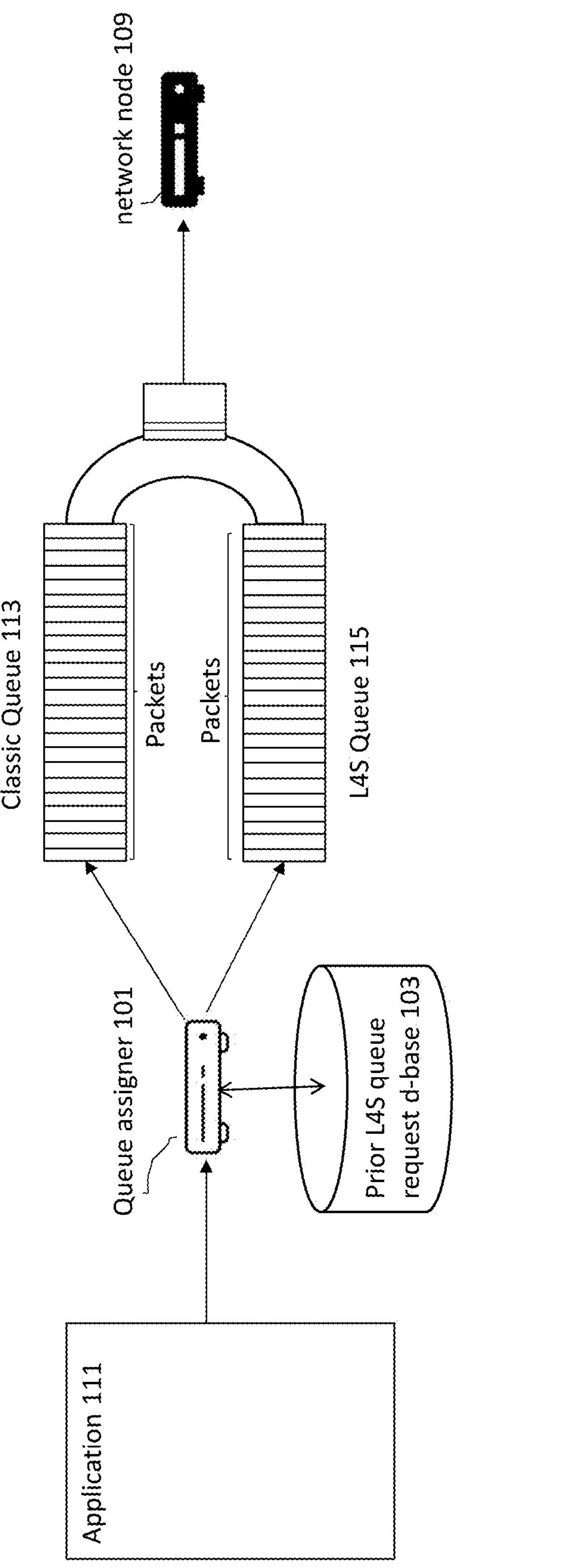
FIG. 1 is an illustration of queue assignment of data packets of network traffic sent by an application, according to an example of an aspect of some embodiments of the present disclosure.

FIG. 1 is an illustration of a queue assigner 101 that may assign data packets received from a sender, such as application 111, to a preferential queue 115, which may be an L4S queue or to a non-preferential or classic queue 113 (sometimes referred to as a "standard queue"). Packets at the head of each queue are processed by network node 109, which may be a destination node or may be an intermediate network node that performs some processing, such as forwarding packets toward a destination-a node other than the ultimate destination node for the packet.

As discussed, L4S may enable Internet applications to achieve low queueing latency, low congestion loss, and scalable throughput control. Internet applications may transition away from congestion control algorithms that cause substantial queueing delay and instead adopt a new class of congestion controls that can seek capacity with very little queueing. These are aided by a modified form of Explicit Congestion Notification (ECN) from the network—an architecture focused on incremental deployment. This architecture defines mechanisms that allow the new class of L4S congestion controls to coexist with "classic" congestion controls in a shared network. The aim is for L4S latency and throughput to be usually much better while typically not impacting significantly processing performance of packets on the classic queue. With L4S, network service providers have introduced dual queueing in their network (especially the access network, which may have limited capacity). While most queue-building traffic (that is, traffic that causes congestion at a network node) passes through a regular/default queue, some traffic may use a low latency queue. This "priority lane" is typically expected to be used by ultra-low latency, non-queue-building traffic. However, applications that are regarded as queue-building may also benefit from this queue if they use it selectively. The scheduler can add data traffic to the L4S, when current traffic is insufficient, to use the priority queue.

Ultra-low-latency video, such as cloud gaming, often requires round-trip time (RTT) latency of 10-100 milliseconds, while low-latency OTT video streaming, such as live sports, may typically require RTT latency of 1-10 seconds. L4S delivery is often enabled for an entire flow belonging to the former traffic class (ultra-low-latency), while the latter class of traffic, being queue-building, may not need L4S. However, according to an implementation of the present disclosure, both classes of traffic would be able selectively to leverage L4S delivery. This is connected to the insight that while video encoders deliver an aggregate bit rate based on the target bit rate input, the instantaneous bit rate can vary drastically and may need assistance from the network for delivery when traffic surges. Hence, L4S may be selectively enabled based on the size of a picture/frame or Packetized Elementary Stream (PES) packet for ultra-low-latency RTP delivery or Common Media Application Format (CMAF) fragment size for low-latency delivery.

Low queueing delay depends on hosts sending their data smoothly, either at a low rate or responding to explicit congestion notifications. So low queueing latency is something hosts create themselves, not something the network gives them. This tends to ensure that self-interest alone does not drive flows to mismark their packets for the low latency queue. However, traffic from an application that produces congestion may be classified for a low latency queue, whether accidentally or maliciously.

QProt is an algorithm to preserve low latency in data flows that are transmitted pursuant to the Data Over Cable Service Interface Specification (DOCSIS), an international telecommunications standard that permits the addition of high-bandwidth data transfer to an existing cable television (CATV) system. QProt protects traffic in the low latency queue from the harm due to excess queueing that would otherwise be caused by such anomalous behavior. The QProt algorithm maintains per-flow-state, where a "flow" is usually defined using an end-to-end (layer-4) 5-tuple. The flow-state may be defined using a queueing score that decays over time. The queueing score may be transformed into time units so that it represents the flow-state's expiry time. A higher queueing score would thus have a longer expiry time. Non-queue-building flows tend to release their flow-state rapidly-usually expiring reasonably early in the gap between the packets of a normal flow. Then the memory can be recycled for packets from other flows that arrive in between. Thus, only queue-building flows hold flow state persistently and raise issues.

The responsibility that each flow bears for queueing delay may be quantified in a variety of ways. The QProt algorithm generates such a score based on the product of the rate of each flow and the level of congestion, both measured at the instant each packet arrives. The instantaneous flow rate is represented at each discrete event when a packet arrives by the packet's size, which accumulates faster the more packets arrive within each unit of time. The level of congestion may be normalized to a dimensionless number between 0 and 1 (probNative). This fractional congestion level may be used. However, queueing delay alone may be used. The unit of the resulting queueing score according to the QProt algorithm is "congested bytes" per second, which distinguishes it from just bytes per second.

Then, during the periods between bursts, no application flow accumulates any queueing score—the high rate of incoming packets may thus be benign. The queueing score may thus represent the share of "blame" for queueing that each flow bears. The scoring algorithm may use the same internal variable, probNative, that the Active Queue Management (AQM) for the low latency queue uses to mark packets using Explicit Congestion Notification (ECN)—described below in more detail. In this way, the queueing score accumulates the size of each arriving packet of a flow but scaled by the value of probNative (in the range 0 to 1) at the instant the packet arrives. So, a data flow's score may accumulate faster the higher the degree of queueing and the faster that the flow's packets arrive when there is queueing.

For example, the queueing score may be a term such as qLscore, calculated as:

$$qLscore = \min(\text{buckets[bckt\_id].t\_exp} - \text{now} + probNative * \text{pkt\_sz}$$

where:

buckets[bckt_id].t_exp represents the current expiry time of the data flow;

and thus buckets[bckt_id].t_exp-now represents the leftover time (accumulated as a result of fast arrival of packets) of an unexpired/persistent flow;

probNative*pkt_sz

AGING may represent the quantity added to the queueing score by the current packet. AGING may be calculated as:

$$\text{AGING} = pow(2, (\text{LG\_AGING} - 30)) * \text{T\_RES};$$

where:

T_RES is the resolution of t_exp (typically measured in ns).

It may represent the time of each "tick" that is counted for the flow state to expire. It may expire when t_exp catches up with current time (now).

LG_AGING may be a constant (default: 19). Note that AGING need not depend on the flow and although calculated from some input parameters it is a property of the system.

To trigger the ejection of a packet from the low latency (LL) queue back to the classic queue, the following logic may be used:

```
if ( ( qdelay > CRITICALqL ) // Test if qdelay over threshold...
   // ...and if flow's q'ing score scaled by qdelay/CRITICALqL
   // ...exceeds CRITICALqLSCORE
   && ( qdelay * qLscore > CRITICALqLPRODUCT ) )
   // Recall that CRITICALqLPRODUCT = CRITICALqL *
   CRITICALqLSCORE
```

If the queue delay threshold is exceeded, the flow's queueing score may be temporarily scaled up by the ratio of the current queue delay to the threshold queueing delay, CRITICALqL. If this scaled up score exceeds another constant threshold CRITICALqLSCORE, the packet may be ejected. The higher the qLscore, the greater the likelihood may be of the packet getting ejected, when the low latency queue delay exceeds a certain threshold. It will be understood that terms such as "critical" and other such terms as used in the illustrative pseudocode provided herein are intended merely as variable identifiers. These are choices in labeling meant to highlight one or more processes described herein and do not necessarily imply that such terms are critical to the disclosure as a whole or to any aspect thereof.

Figure 2:
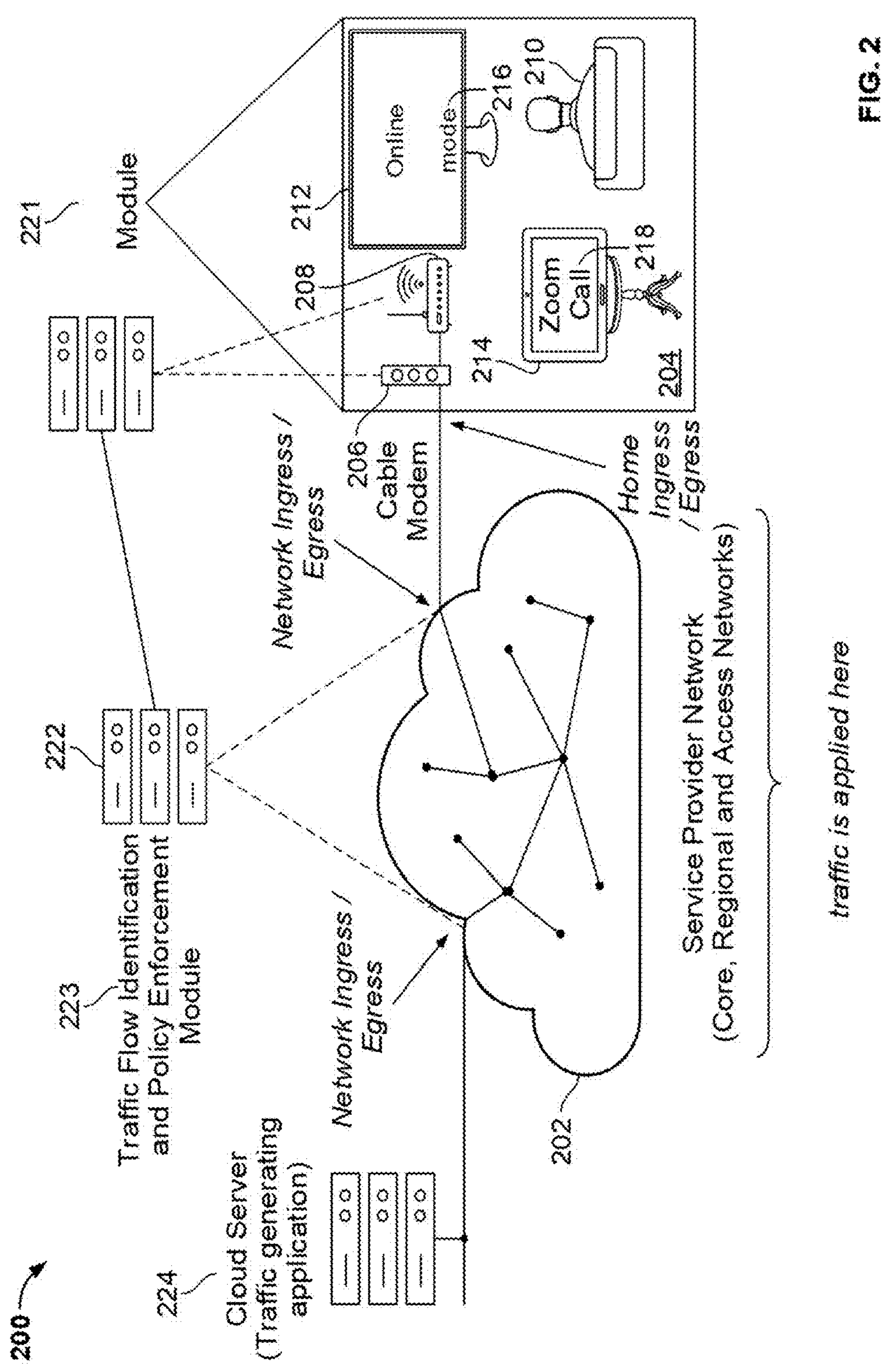
FIG. 2 illustrates examples of network contexts in which a dual queue service configuration may be provided, in accordance with an aspect of some embodiments of the present disclosure.

FIG. 2 shows an illustrative architecture for processing network traffic, in accordance with some embodiments of this disclosure. System 200 may comprise service provider network 202, physical location 204 (e.g., at least one of a home of user 210, a place of business, a school, or any other suitable location, any combination thereof, or the like), networking equipment 206 and 208 (e.g., a modem, router, switch, gateway, wireless access point, mesh access point, extender, hub, and/or any other suitable networking equipment), devices 212 and 214. In some embodiments, modem 206, router 207 and/or networking equipment 222 may comprise a traffic analysis module 221 and/or a traffic flow identification and policy enforcement module (TIPE) module 223. In some embodiments, cloud server 224 comprises a traffic generating application 225. System 200 may comprise any suitable combination of hardware and/or software to provide the functionalities described herein.

Service provider network 202 may include, for example, any suitable software and/or hardware (e.g., networking equipment, servers, and/or databases) and/or any suitable infrastructure (e.g., physical cable transmission lines, fiber-optic transmission channels or mediums or channels, satellites) to provide core, regional, access networks and/or backhaul (and/or any other suitable portion of the network) of one or more Internet service providers (ISPs), to facilitate a telecommunications network. In some embodiments, the ISP may be provided by a business or other organization that provides access to the Internet for a fee. For example, service provider network 202 may correspond to or comprise a wide area network (WAN), to facilitate Internet connectivity (or connectivity over any other suitable public or private network) between networked devices worldwide or over any other suitable geographic region or location(s), to enable such devices to exchange information and resources. In some embodiments, a WAN or service provider network 202 may be used to connect LANs (and/or other types of communication) to enable electronic communications between remotely located devices. In the example of FIG. 2, the local area network (LAN), e.g., a small scale network for data exchange between a group of computers or other devices at a single location, provided at location 204 by way of networking equipment 206 and/or 208, may not be considered as part of the WAN provided by service provider network 202. Service provider network 202 may provide broadband, high bandwidth Internet access.

In some embodiments, networking equipment 222 and cloud server 224 may be located remote from location 204. The devices, servers, and networking equipment of system 200 may communicate over a wired connection and wireless connection. For example, devices 212, 214 and networking equipment 206 and 208 may be equipped with antennas for transmitting and receiving electromagnetic signals at frequencies within the electromagnetic spectrum, e.g., radio frequencies, to communicate with each other over a network in a localized area. The network within location 204 may correspond to, e.g., a wireless fidelity (Wi-Fi) network, such as, for example, 802.11n, 802.11ac, 802.11ax, Wi-Gig/802.11ad, 802.11 (Wi-Fi 7) at a fronthaul of a telecommunications network, to provide wireless networking technology allowing electronic devices to connect to one another and/or the Internet from a shared network access point.

The devices of system 200 may communicate over a wired LAN and/or may communicate wirelessly over a wireless LAN (WLAN) and to transmit data to and receive data from the Internet and may be present within an effective coverage area of the localized network. The Internet is a global system of interconnected computer networks and devices employing common communication protocols, e.g., the transmission control protocol (TCP), user datagram protocol (UDP) and the Internet protocol (IP) in the TCP/IP or UDP/IP suite.

Router 208 may be configured to forward or route data packets from the Internet connection, received by way of modem 206, to devices within the localized network of system 200 and receive data packets from such devices. In some embodiments, router 208 may include a built-in modem to provide access to the Internet for the household (e.g., received by way of cable or fiber connections included in backhaul portions of a telecommunications network), built-in switches or hubs to deliver data packets to the appropriate devices within the Wi-Fi network, built-in access points to enable devices to wirelessly connect to the Wi-Fi network, and/or system 200 may include one or more stand-alone modems, switches, routers and access points. In some embodiments, modem 206 and/or router 208 may be leased from and/or installed at location 204 (e.g., the customer's premises) by the ISP as part of a managed Wi-Fi install, to give service provider network 202 visibility into LAN and WAN network traffic associated with data transmitted to or receive from modem 206 of location 204.

In some embodiments, one or more applications and/or media assets may be provided to user 210 by way of wired or wireless signals transmitted through the LAN at location 204. For example, user 210 may be playing a video game 216 (e.g., "Call of Duty") via smart television 212 and/or a video game console, each of which may be connected to the Internet via the LAN within location 204 to provide such video game. As another example, tablet 214 may simultaneously be connected to the Internet via the LAN to provide a video conferencing application (e.g., Zoom) 218 to user 210. Data traffic may be generated downstream (server to client) or upstream (client to server), in addition, by a video streaming application, a gaming application, LiDAR, a Simultaneous Localization and Mapping (SLAM) application (for example, an edge server providing SLAM data to an autonomous vehicle or extended reality (XR) device, or the like. Such SLAM data may include video data and/or Inertial Measurement Unit (IMU) data. In some embodiments, a cloud-based architecture uses SCReAM (Self-Clocked Rate Adaptation for Multimedia) (RTP), a mobile optimized congestion control algorithm for real-time interactive media that is used mainly for video, or any other suitable technique, for extreme low latency video delivery from a cloud game instance to the client device, with the ability to turn on or off requesting L4S within the same packet flow (e.g., during a session).

In some embodiments, devices 212 and 214 may be, for example a headset; a mobile device such as, for example, a smartphone or tablet; a laptop computer; a personal computer; a desktop computer; a smart television; a smart watch or wearable device; smart glasses; extended reality (XR) head-mounted display (HMD); a stereoscopic display; a wearable camera; XR glasses; XR goggles; a near-eye display device; a robot; an autonomous cleaning device; or any other suitable user equipment or device capable of connecting to the Internet or other suitable network; or any combination thereof. XR may be understood as virtual reality (VR), augmented reality (AR) or mixed reality (MR) technologies, or any suitable combination thereof. VR systems may project images to generate a three-dimensional environment to fully immerse (e.g., giving the user a sense of being in an environment) or partially immerse (e.g., giving the user the sense of looking at an environment) users in a three-dimensional, computer-generated environment. Such environment may include objects or items that the user can interact with. AR systems may provide a modified version of reality, such as enhanced or supplemental computer-generated images or information overlaid over real-world objects. MR systems may map interactive virtual objects to the real world, e.g., where virtual objects interact with the real world or the real world is otherwise connected to virtual objects.

In some embodiments, traffic analysis module 221 and TIPE module 223 may be implemented in conjunction to achieve one of more of the functionalities described herein. For example, traffic analysis module 221 may compute results of network traffic analysis in the LAN and/or WAN in real-time for a subscriber home (e.g., at location 204) and/or perform a metering function with respect to preferential and/or non-preferential network traffic, and TIPE module 223 may be configured to apply a policy when a data cap is met, based on an indication received from traffic analysis module 221.

Figures 3A, 3B:
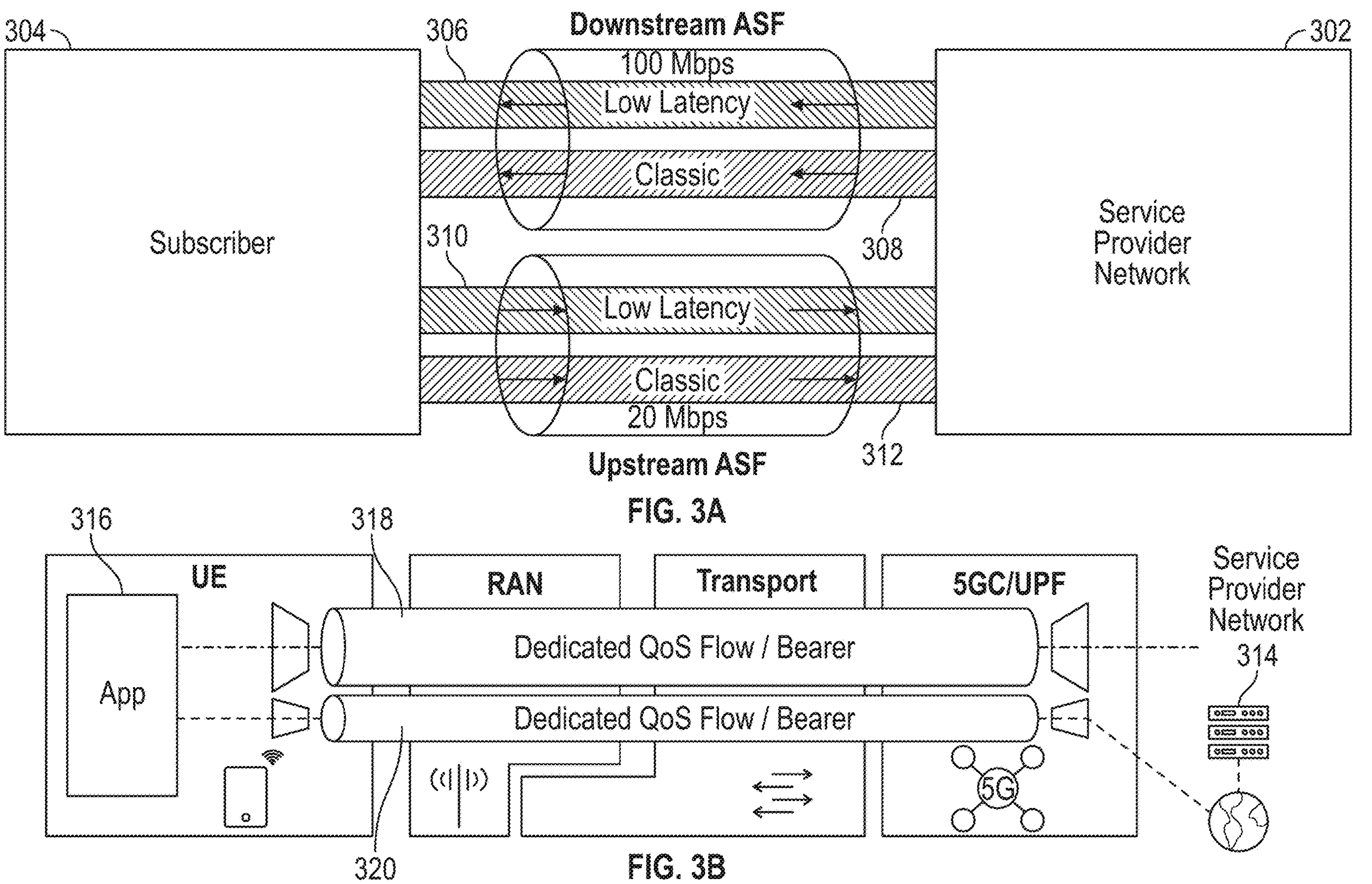
FIGS. 3A-3B is an illustrative block diagrams providing the dual queue service configuration, in accordance with an aspect of some embodiments of this disclosure.

FIGS. 3A-3B show illustrative block diagrams for providing a dual queue service configuration, in accordance with some embodiments of this disclosure. System 200 may provide (e.g., in the WAN) a queue for low latency (e.g., L4S) network traffic and a queue for classic traffic, based at least in part using networking equipment 222 of FIG. 2. For example, the low latency queue of system 200 may be associated with low latency service flow 306 and low latency service flow 310, and the classic queue of system 100 may be associated with classic queue of service flow 308 and 312, as discussed in more detail in as White et al., "Low Latency DOCSIS: Technology Overview," Cable Labs, 2019 Fall Technical Forum SCTE-ISBE (hereinafter "White et al.), the contents of which are hereby incorporated by reference herein in their entirety. A downstream aggregate service flow (ASF) over service flow 306, 310 between subscriber 204 and service provider network 202 may include low latency service flow 306 and classic service flow 310, and an upstream ASF between subscriber 204 and service provider network 202 may include low latency service flow 310 and classic service flow 312. In some embodiments, networking equipment (e.g., modem 106 and/or router 108 and/or other networking equipment) may provide one or more buffers or other suitable memory at which the low latency queue and the classic queue may be stored. In some embodiments, system 100 may employ per-flow queues and/or per-flow AQMs, in addition to or in the alternative to dual-queueing.

In some embodiments, service provider network 302 may correspond to service provider network 202 of FIG. 2, networking equipment modem 206 and/or router 208, and subscriber 204 may correspond to networking equipment 206, 208 of user 210 at location 204 of FIG. 2. FIG. 3B may correspond to an architecture for a cellular network, and service provider network 314 which may correspond to service provider network 202 of FIG. 2, and client device or user equipment 316 may correspond to service provider network 202 of FIG. 2, networking equipment 222 and/or cloud server 224.

L4S provides an end-to-end solution to provide certain traffic flows, such as, for example, gaming or voice, with reduced latency. With L4S, the data source and/or data recipient may execute congestion control algorithms to efficiently utilize available capacity while minimizing latency and packet loss, where the data source may use congestion feedback received from the recipient to optimize data transmission. With L4S, the header of an IP packet may indicate, via an explicit congestion notification (ECN), whether the IP packet supports L4S and whether congestion is being experienced, e.g., marking specific packets as having queueing delay that exceeds a threshold. L4S may be implemented at the transport layer by the service provider network and/or application service providers at client and server. In some embodiments, L4S may be enabled by operating system (OS) providers, such as, for example, Google and Apple.

As stated in RFC 9330, "The Dual-Queue Coupled AQM . . . acts like a 'semi-permeable' membrane that partitions latency but not bandwidth. As such, the two queues are for transitioning from Classic to L4S behavior, not bandwidth prioritization." RFC 9330 further states that "Two separate queues are used to isolate L4S queueing delay from the larger queue that Classic traffic needs to maintain full utilization" and "The two queues act as if they are a single pool of bandwidth in which flows of either type get roughly equal throughput without the scheduler needing to identify any flows."

RFC 9330 further states that "the scheduler can serve the L4S queue with priority (denoted by the '1' on the higher priority input), because the L4S traffic is not offering up enough traffic to use all the priority that it is given. Therefore, for latency isolation on short timescales (sub-round-trip), the prioritization of the L4S queue protects its low latency by bursts to dissipate quickly; but for bandwidth pooling on longer timescales (round-trip and longer), the Classic queue creates an equal and opposite pressure against the L4S traffic to ensure that neither has priority when it comes to bandwidth—the tension between prioritizing L4S and coupling the marking from the Classic AQM results in approximate per-flow fairness."

As further stated in White et al., AQM can ensure that the Classic queue is not starved: "To enable the Low Latency Queue to rapidly dequeue an arrived burst of traffic, the Inter-Service-Flow scheduler gives a higher weight to the Low Latency Queue than it does to the Classic Queue. The coupling to the Low Latency AQM counterbalances the weighted scheduler by making low-latency applications leave space for Classic traffic. This ensures that the weighted scheduler does not give priority over bandwidth, as a traditional weighted scheduler would." Further, as stated in Internet Engineering Task Force (IETF), "Dual-Queue Coupled Active Queue Management (AQM) for Low Latency, Low Loss, and Scalable Throughput (L4S)," RFC 9332 January 2023, (referred to herein as RFC 9332), the contents of which are hereby incorporated by reference herein in their entirety: "The scheduling weight of the Classic queue should be small (e.g., 1/16) . . . if L4S traffic is over-aggressive or unresponsive, the scheduler weight for Classic traffic will at least be large enough to ensure it does not starve in the short term" and "The scheduler draining the two queues MUST give L4S packets priority over Classic, although priority MUST be bounded in order not to starve Classic traffic" and "The L4S queue has latency priority within sub-round-trip timescales, but over longer periods the coupling from the Classic to the L4S AQM . . . ensures that it does not have bandwidth priority over the Classic queue."

Figure 5:
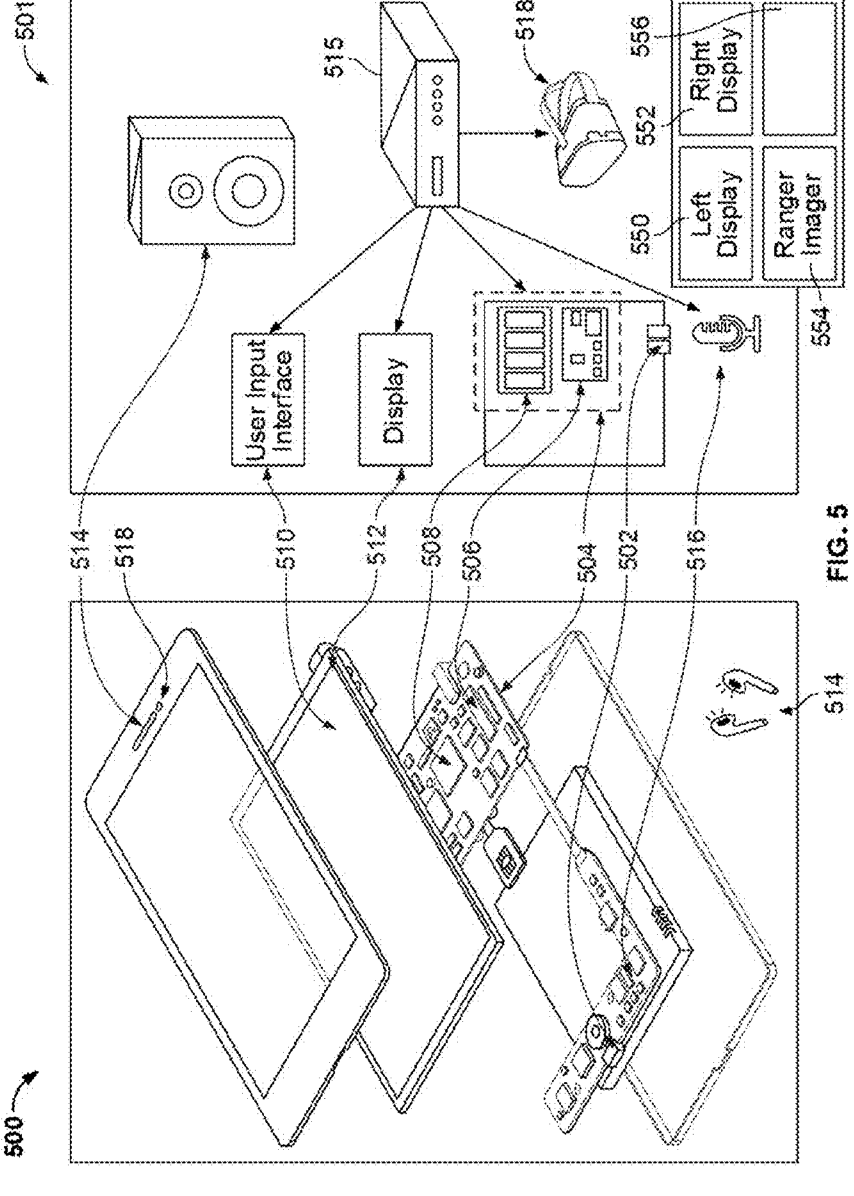
FIG. 5 illustrates a computer system that may be used to conduct processing, in accordance with an aspect of some embodiments of the present disclosure.

FIG. 4 shows marking of explicit congestion notification (ECN) bits, in accordance with some embodiments of this disclosure. L4S may be enabled by marking the ECN bits in the UP header of the packet. As shown in FIG. 5, the ECT(1) marking indicates that the sender is capable of L4S transport. If a network element experiences congestion, it converts the 2-bit ECN marking from ECT(1) to CE. The markings may be echoed back to the sender in acknowledgements from the receiver. The sender is then required to reduce throughput in scalable manner.

In some embodiments, to determine whether a packet should be assigned to a low latency service flow (e.g., 206, 210, 218 of FIGS. 3A-3B), ISPs and application service providers of low latency traffic (e.g., cloud gaming) of system 200 may mark portions of their traffic with a codepoint, e.g., a differentiated services (DiffServ) codepoint or any other suitable codepoint. This codepoint indicates the ISP's and/or application service provider's ability to perform scalable congestion control, e.g., to respond to a congestion notification in a graceful manner that does not aggressively reduce throughput. For example, the ISP or application service provider may use the DiffServ field information to shift a packet to the low latency service flow in a "weakest link" of the network, such as, for example, the access network. In some embodiments, the ISP or application service provider may signal congestion using an ECN field when appropriate, to produce degradation in throughput from the application service provider's server. In some embodiments, an ISP and/or application service provider may allow a customer to indicate that network traffic to a particular device and/or for a particular application, e.g., based on a particular service type associated with the application, should be provided with latency priority, e.g., assigned to the low latency service flow.

In some embodiments, ECN may be contained within the DiffServ codepoint to indicate whether or not congestion is experienced by marking the two least-significant bits in the DiffServ in the IP header identifying a data packet. For example, the most significant six bits in the DiffServ field may contain the differentiated services code point (DSCP) bits, and the state of the two ECN bits indicates whether or not the packet is an ECN-capable packet and whether or not congestion has been experienced. A sender of network traffic may indicate a packet as ECN-capable or non-ECN-capable based on whether the sender is ECN-capable. If an ECN-capable packet experiences congestion at the egress queue of a switch, router, and/or other network component, such switch, router, and/or other network component may mark the packet as experiencing congestion. When the packet reaches the ECN-capable receiver (destination endpoint), the receiver echoes the congestion indicator to the sender (source endpoint) by sending a packet marked to indicate congestion, and after receiving the congestion indicator from the receiver, the source endpoint reduces the transmission rate to relieve the congestion," as described in "Understanding CoS Explicit Congestion Notification," Juniper Product and Release Support, Nov. 29, 2023, the contents of which are hereby incorporated by reference herein in their entirety.

As shown in FIG. 4, in some embodiments, two ECN bits in the DiffServ field provide four codes that determine if a packet is marked as an ECN-capable transport (ECT) packet, meaning that both endpoints of the transport protocol are ECN-capable, and if there is congestion experienced (CE). Historically, codes 01 and 10 had the same meaning, namely that the sending and receiving endpoints of the transport protocol are ECN-capable, and there was no difference between these codes. ECT(1) may be earmarked as the bit pattern for L4S-capable traffic. System 100 may modify such interpretation of the ECN bits by assigning distinct meanings to ECT(0) and ECT(1) in order to designate at least two different traffic classes. In some embodiments, ECT(1), e.g., bit pattern 01, may be used to indicate L4S-capable traffic, and ECT(0), e.g., bit pattern 10, may be used to indicate that the sender is capable of receiving explicit congestion notification (though the sender may not be compliant with L4S). In some embodiments, L4S-capable traffic marked by an application server is assigned to ECT(1) and L4S-capable traffic marked by an ISP (e.g., based on customer preferences) is assigned to ECT(0). For example, ECT(0) is used as an internal reference for network traffic that is designated as preferential by the ISP rather than the application provider. In some embodiments, ISPs can independently choose which bit combination represents one of the two classes described above, or multiple ISPs can agree on the definition and/or choice of ECT(0) and ECT(1). In some embodiments, system 100 may add one or more extra bits to be added, specifically to indicate whether such a data packet having such bits was marked by an ISP operator or application service provider providing L4S enablement.

In some embodiments, the same bits that are used for designating whether the client-server are ECN-capable may also be used for marking whether congestion is actually experienced in the network (bits 11: CE). Thus, if a packet has the ECN bits marked as CE, then, in order to classify it as either marked by the application service provider or by the ISP (to meter the traffic accurately and apply policy), the ISP may perform a lookup of that flow identifier (ID) from a prior packet belonging to the same network traffic flow to check its traffic class, to determine whether the sender packet was marked with 10 or 01.

FIGS. 5-21 show illustrative devices, systems, servers, and related hardware for selectively treating portions of network traffic preferentially, in accordance with some embodiments of this disclosure. FIG. 5 shows generalized embodiments of illustrative computing device 500, which may correspond to, e.g., a smart phone; a tablet; a laptop computer; a personal computer; a desktop computer; a smart television; a smart watch or wearable device; smart glasses; a stereoscopic display; a wearable camera; virtual reality (VR) glasses; VR goggles; a stereoscopic display; augmented reality (AR) glasses; an AR HMD; a VR HMD; or any other suitable computing device; or any combination thereof. In another example, computing device 501 may be a user television equipment system or device. In some embodiments, computing device 500 may correspond to, e.g., device 112 or device 114 of FIG. 1.

User television equipment device 501 may include set-top box 515. Set-top box 515 may be communicatively connected to microphone 516, Audio output equipment (e.g., speaker or headphones 514), and display 512. In some embodiments, microphone 516 may receive audio corresponding to a voice of a user providing input. In some embodiments, display 1012 may be a television display or a computer display. In some embodiments, set-top box 515 may be communicatively connected to user input interface 510. In some embodiments, user input interface 510 may be a remote control device. Set-top box 515 may include one or more circuit boards. In some embodiments, the circuit boards may include control circuitry, processing circuitry, and storage (e.g., RAM, ROM, hard disk, removable disk, or the like, or a combination of the foregoing.). In some embodiments, the circuit boards may include an input/output path. In some embodiments, computing device 500 may comprise any suitable number of sensors (e.g., gyroscope or accelerometer, etc.), and/or a GPS module (e.g., in communication with one or more servers and/or cell towers and/or satellites) to ascertain a location of computing device 500. In some embodiments, computing device 500 comprises a rechargeable battery that is configured to provide power to the components of the device.

Computing device 500 may receive content and data via input/output (I/O) path 502. I/O path 502 may provide content (e.g., broadcast programming, on-demand programming, Internet content, content available over a local area network (LAN) or wide area network (WAN), and/or other content) and data to control circuitry 504, which may comprise processing circuitry 506 and storage 508. Control circuitry 1004 may be used to send and receive commands, requests, and other suitable data using I/O path 502, which may comprise I/O circuitry. I/O path 502 may connect control circuitry 504 (and specifically processing circuitry 506) to one or more communications paths (described below). I/O functions may be provided by one or more of these communications paths but are shown as a single path in FIG. 5 to avoid overcomplicating the drawing. While set-top box 1015 is shown in FIG. 3 for illustration, any suitable computing device having processing circuitry, control circuitry, and storage may be used in accordance with the present disclosure. For example, set-top box 515 may be replaced by, or complemented by, a personal computer (e.g., a notebook, a laptop, a desktop), a smartphone (e.g., computing device 1000), an XR device; a tablet; a network-based server hosting a user-accessible client device; a non-user-owned device; any other suitable device; or any combination thereof.

Control circuitry 504 may be based on any suitable control circuitry such as processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry may be distributed across multiple separate processors or processing units, for example, multiple of the same type of processing units (e.g., two Intel Core i9 processors) or multiple different processors (e.g., an Intel Core i7 processor and an Intel Core i9 processor). In some embodiments, control circuitry 504 executes instructions for the system or application stored in memory (e.g., storage 508). Specifically, control circuitry 504 may be instructed by the system or application to perform the functions discussed above and below. In some implementations, processing or actions performed by control circuitry 504 may be based on instructions received from the system or application.

In client/server-based embodiments, control circuitry 504 may include communications circuitry suitable for communicating with a server or other networks or servers. The system or application may be a stand-alone application implemented on a device or a server. The system or application may be implemented as software or a set of executable instructions. The instructions for performing any of the embodiments discussed herein of the system or application may be encoded on non-transitory computer-readable media (e.g., a hard drive, random-access memory on a DRAM integrated circuit, read-only memory on a BLU-RAY disk, etc.). For example, the instructions may be stored in storage 508, and executed by control circuitry 504 of a computing device 500.

In some embodiments, the system or application may be a client/server application where only the client application resides on device 500 (e.g., device 112 or 114 of FIG. 1), and a server application resides on an external server (e.g., server 2104 of FIG. 21). For example, the system or application may be implemented partially as a client application on control circuitry 504 of device 500 and partially on server 2104 as a server application running on control circuitry 2111. Server 2104 may be a part of a local area network with one or more of computing device 500 or may be part of a cloud computing environment accessed via the Internet. In a cloud computing environment, various types of computing services for performing searches on the Internet or informational databases, providing video communication capabilities, providing storage (e.g., for a database) or parsing data are provided by a collection of network-accessible computing and storage resources (e.g., server 2104 and/or an edge computing device), referred to as "the cloud." Device 500 may be a cloud client that relies on the cloud computing capabilities from server 2104 to determine whether processing (e.g., at least a portion of virtual background processing and/or at least a portion of other processing tasks) should be offloaded from the mobile device and facilitate such offloading. When executed by control circuitry of server 2104, the system or application may instruct control circuitry 2111 to perform processing tasks for the client device and facilitate applying preferential treatment on the WAN to certain network traffic corresponding to data requested by a device on a LAN. The client application may instruct control circuitry 504 to determine where processing should be performed.

Control circuitry 504 may include communications circuitry suitable for communicating with a server, edge computing systems and devices, a table or database server, or other networks or servers The instructions for carrying out the above mentioned functionality may be stored on a server (which is described in more detail in connection with FIG. 21. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 21). In addition, communications circuitry may include circuitry that enables peer-to-peer communication of computing devices, or communication of computing devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as the system or application data described above. Nonvolatile memory may also be used (e.g., to launch a boot-up routine and other instructions). Cloud-based storage, described in more detail in relation to FIG. 12, may be used to supplement storage 508 or instead of storage 508.

Control circuitry 504 may include video generating circuitry and tuning circuitry, such as one or more analog tuners, one or more MPEG-2 decoders or MPEG-2 decoders or decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 504 may also include scaler circuitry for upconverting and downconverting content into the preferred output format of computing device 500. Control circuitry 504 may also include digital-to-analog converter circuitry and analog-to-digital converter circuitry for converting between digital and analog signals. The tuning and encoding circuitry may be used by computing device 500 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to control simultaneous tuning functions (e.g., watch and record functions, picture-in-picture (PIP) functions, multiple-tuner recording, etc.). If storage 508 is provided as a separate device from computing device 500, the tuning and encoding circuitry (including multiple tuners) may be associated with storage 508.

Control circuitry 504 may receive instruction from a user by way of user input interface 510. User input interface 510 may be any suitable user interface, such as a remote control, mouse, trackball, keypad, keyboard, touchscreen, touchpad, stylus input, joystick, voice recognition interface, or other user input interfaces. Display 812 may be provided as a stand-alone device or integrated with other elements of each one of computing device 1000 and computing device 501. For example, display 1012 may be a touchscreen or touch-sensitive display. In such circumstances, user input interface 1010 may be integrated with or combined with display 512. In some embodiments, user input interface 1010 includes a remote-control device having one or more microphones, buttons, keypads, any other components configured to receive user input or combinations thereof. For example, user input interface 1010 may include a handheld remote-control device having an alphanumeric keypad and option buttons. In a further example, user input interface 510 may include a handheld remote-control device having a microphone and control circuitry configured to receive and identify voice commands and transmit information to set-top box 515.

Audio output equipment 514 may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Audio output equipment 1014 may be provided as integrated with other elements of each one of computing device 500 and computing device 501 or may be stand-alone units. An audio component of videos and other content displayed on display 512 may be played through speakers (or headphones) of audio output equipment 514. In some embodiments, audio may be distributed to a receiver (not shown), which processes and outputs the audio via speakers of audio output equipment 514. In some embodiments, for example, control circuitry 504 is configured to provide audio cues to a user, or other audio feedback to a user, using speakers of audio output equipment 514. There may be a separate microphone 516 or audio output equipment 514 may include a microphone configured to receive audio input such as voice commands or speech. For example, a user may speak letters, words, terms and/or numbers that are received by the microphone and converted to text by control circuitry 504. In a further example, a user may voice commands that are received by a microphone and recognized by control circuitry 504. Camera 518 may be any suitable video camera integrated with the equipment or externally connected. Camera 518 may be a digital camera comprising a charge-coupled device (CCD) and/or a complementary metal-oxide semiconductor (CMOS) image sensor. Camera 518 may be an analog camera that converts to digital images via a video card.

The system or application may be implemented using any suitable architecture. For example, it may be a stand-alone application wholly implemented on each one of computing device 500 and computing device 501. In such an approach, instructions of the application may be stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to provide the functionality, and generate any of the displays, discussed herein. Based on the processed instructions, control circuitry 504 may determine what action to perform when input is received from user input interface 510. For example, movement of a cursor on a display up/down may be indicated by the processed instructions when user input interface 510 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 504 may allow a user to provide user profile information or may automatically compile user profile information. For example, control circuitry 504 may access and monitor network traffic, video data, audio data, processing data, historical interactions by the user, and/or any other suitable data. Control circuitry 504 may obtain all or part of other user profiles that are related to a particular user (e.g., via social media networks), and/or obtain information about the user from other sources that control circuitry 504 may access. As a result, a user can be provided with a unified experience across the user's different devices.

In some embodiments, the system or application is a client/server-based application. Data for use by a thick or thin client implemented on each one of computing device 500 and computing device 501 may be retrieved on-demand by issuing requests to a server remote to each one of computing device 500 and computing device 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on computing device 1000. This way, the processing of the instructions is performed remotely by the server while the resulting displays (e.g., that may include text, a keyboard, or other visuals) are provided locally on computing device 500. Computing device 500 may receive inputs from the user via input interface 310 and transmit those inputs to the remote server for processing and generating the corresponding displays. For example, computing device 500 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to computing device 500 for presentation to the user.

In some embodiments, the system or application may be downloaded and interpreted or otherwise run by an interpreter or virtual machine (run by control circuitry 504). In some embodiments, system or application may be encoded in the ETV Binary Interchange Format (EBIF), received by control circuitry 504 as part of a suitable feed, and interpreted by a user agent running on control circuitry 504. For example, the system or application may be an EBIF application. In some embodiments, the system or application may be defined by a series of JAVA-based files that are received and run by a local virtual machine or other suitable middleware executed by control circuitry 504. In some of such embodiments (e.g., those employing MPEG-2, MPEG-4, HEVC or any other suitable digital media encoding schemes), the system or application may be, for example, encoded and transmitted in an MPEG-2 object carousel with the MPEG audio and video packets of a program.

In an embodiment, an application that judiciously or selectively uses L4S may get some credit as a reward for its avoidance of the precious L4S queue resource. This credit may be applied to a subsequent data flow associated with the application in one or more ways.

In an implementation of such an approach, a fine timer (e.g., measured in nanoseconds) may be used to count up very fast. The timer may count up fast enough that it is typically expired (when it catches up with qLscore) between packet interarrival times of non-queue-building data flows. On the other hand, for queue-building data flows (i.e., flows that result in congestion at the network node), the timer may be unable to count to expiry between packet arrivals, leading to accumulation in the timer value until a threshold is reached. It is as such times, when a packet burst arrives requesting use of the L4S queue, the network node may determine whether this data flow has persistent state as indicated by a different timer than the previously described expiry timer. This timer, henceforth called Macro Timer, may be used to determine the time since the previous burst which had requested the L4S queue. If it is determined that a threshold amount of time has passed since the previous use of the L4S queue by this data flow or by a data flow associated with the application that has received the credit, then a reduced timer expiry may be set for each new packet arrival of the data flow. If the packet meets the criteria for ejection, then it is moved to the classic queue for processing. On the other hand, if ejection criteria are not met, then the packet may be processed by the L4S queue. Each new packet in the burst may be treated in this manner. The "credit," i.e., the amount by which the expiry time for each new packet is reduced may be constant, or it may be a variable as explained below.

Figure 6:
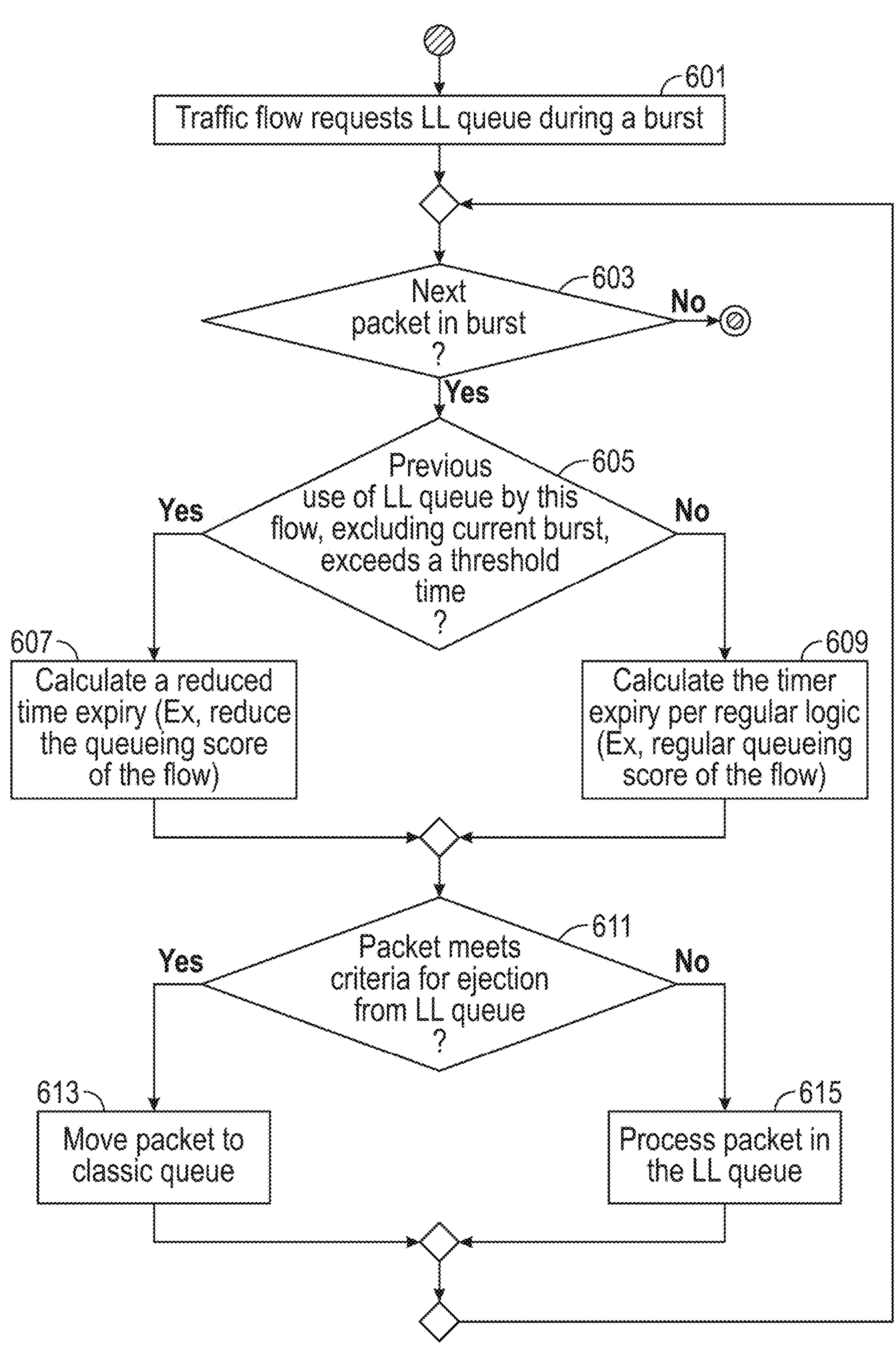
FIG. 6 is a flowchart showing processing in accordance with an aspect of some embodiments of the present disclosure.

FIG. 6 is a flowchart showing an example of steps according to an aspect of the present disclosure. As shown at 601, a traffic flow may request L4S queue processing during a data burst. For example, the ECN bits of a packet of data flow may indicate that L4S queue processing is requested. At 603, the system, for example, the queue assigner 101 shown in FIG. 1, may determine whether the next packet in the burst has been received. If yes, then at 605, the system may determine whether the previous use of the L4S queue by a data flow associated with the application or other sender, excluding the current burst, occurred within a threshold period of time. That is, in an implementation, only application data flows that were received at the network node prior to the current data burst may be assessed to determine whether the current data flow is to be given credit.

Whether a data flow is associated with an application may be determined in a variety of ways, for example, using the 5-tuple discussed herein. A previous packet may be deemed to have been sent as part of the current burst (and thus may be excluded from receiving credit) if the queueing timer has not expired—indicating congestion.

If it is determined that the period since the previous use of the L4S queue by a data flow associated with the current application flow excluding the current burst, exceeds the threshold period of time (e.g., the sender has not used the L4S queue in a while), then at 607 a credit may be applied for the packet. This credit may be in the form of reducing the timer expiry: the "blame" attributed to this particular application flow for causing traffic congestion at this network node is deemed to be less than the actual blame per the definition of the queueing score—the queueing score as calculated for packets of the present data flow may thus be deemed to be lower (e.g., to decay more quickly). This may result in a lower likelihood of the packets of the application flow being redirected to the standard or classic queue. On the other hand, if the previous data flow associated with the sender application was less than a threshold time ago, then at 609 the application flow associated with this sender may be deemed not to be entitled to the credit: The timer expiry for the queueing score may thus be calculated. For example, a regular decay timer for the queueing score may be used to determine whether the packets of the flow are entitled to the L4S queue processing.

In either case, however the queueing score expiry timer is calculated, at 611 packets that meet the criteria for ejection from the L4S queue are moved to the classic, non-preferential queue, and at 613 are processed accordingly. Packets that are determined to qualify for the L4S queue are processed at 615 by the L4S queue.

QProt algorithm has a timer with a "tick time" that may be several orders of magnitude shorter than typical packet interarrival times (for non-queue-building flows). According to an implementation, a new timer, Macro Timer, may be used that may have a "tick time" several orders of magnitude larger than typical packet interarrival times.

In an implementation, a reduced expiry of the flow state timer may be calculated by reducing the queueing score of the flow. The flow state timer is the expiry timer as defined in the QProt algorithm (not the Macro Timer). The Macro Timer may be cleared and re-started every time a flow state expires, i.e., the flow is no longer persistent based on the expiry timer. Thus, there may be a coupling between the expiry timer and the Macro Timer even though they operate on very different timescales.

```
If (buckets[bckt_id].t_exp == now)
    record {buckets[bckt_id].id, t_macro = 0}
```

As shown in the pseudocode, the value of the flow-id (an appropriately concise representation of the 5-tuple) is recorded and t_macro could be set to the current time and started. Also, this logic may run every single "tick time" of the expiry timer. Thus, as soon as a flow's expiry timer expires, t_macro may be set to current time and it begins to count up.

When a packet arrives as part of a data flow, the following logic may be applied:

```
If(buckets[bckt_id].t_exp > now)
{
  If(t_macro > T_THRESH)
    qLscore = min(buckets[bckt_id].t_exp − now + probNative *
  pkt_sz / AGING − ll_selective, qLSCORE_MAX)
}
```

According to the first line of the pseudocode, the system may check whether the flow state has not expired before proceeding to the next step. If the flow state has expired, then there is no need for providing a "credit" to this flow because there is likely little to no significant congestion at this node. On the other hand, if the flow state is indeed persistent, then the queue assigner 101 may check whether t_macro has counted up to a value beyond a threshold T_THRESH. This is to ensure that this flow is deserving of the credit because it has not used the L4S queue resource in a while—for at least the threshold period of time set by T_THRESH threshold.

If the threshold time has indeed passed, then the system may award credit to the flow in one of several ways. In an implementation, the queue assigner 101 may calculate qLscore as known but may also subtract an extra term ll_selective to reduce its value. This is shown in FIG. 7. If the qdelay is greater than CRITICALql, it means that there is significant congestion at the network resource. Then qLscore is reduced as described herein.

In some embodiments, ll_selective may be a constant. In this way, the same "credit" may be given to each packet arriving in the new burst. In an embodiments, the "credit" may be "used up" over time: the credit may be reduced with the arrival of each new packet of the data flow when the flow state is persistent (due to the burst). In this case, ll_selective may be modeled as:

$$\text{ll\_selective} = \{K/(\text{t\_exp} - \text{now})^{\alpha}\}$$

where:

t_exp represents the expiry timer of the specific flow holding persistent state for which the new packet arrived.

K is a constant.

T_exp-now represents an accumulation of the previous qLscore as it is being decayed with each tick.

With fast arrival of new packets in the burst, t_exp will increase (even if it increases more slowly due to subtraction of ll_selective), therefore (t_exp-now) will increase faster than the time ticks. The resulting effect will be that ll_selective will reduce with the arrival of each new packet in the burst. The exponent a controls the rate at which ll_selective reduces with each packet.

In another implementation, the credit for good behavior by the flow of the sender may be awarded by dynamically adjusting the threshold for congestion at the receiving node, e.g., CRITICALqLPRODUCT. A statistical function, such as mean or median, e.g., beta_qLScore, of previous packets' good behavior, e.g., qLScore, may be calculated.

In a flow-specific implementation, a dynamic credit adjustment may be made to the CRITICALqLPRODUCT based on the behavior of previous packets over time. In the pseudocode shown below, a new variable, beta_qLScore, may be used. On each packet's arrival, the CRITICALqLPRODUCT may be updated as follows:

```
CRITICALqLPRODUCT =
CRITICALqL * (CRITICALqLSCORE + |CRITICALqLSCORE −
beta_qLScore|)
```

Thus, the CRITICALqLPRODUCT, which in an implementation, is a static threshold value, instead may be set as CRITICALqL*CRITICALqLSCORE. The CRITICALqLPRODUCT is used in determining whether the flow is not using the low latency queue in a "fair" manner and whether the flow gets moved to the non-LL queue (classic queue). Upon each packet's arrival, the new variable beta_qLScore gets updated by calling a new the method updateBetaScore (qLScore), which may calculate an adjustment beta score based on previous packets' history. This function updateBetaScore could be a calculation like median, mean or any other definition of a beta score to use for a credit for a good application's low latency use. As shown in FIGS. 9A-D, when the next packet arrives, the CRITICALqLPRODUCT may be dynamically calculated based on the value of the beta_qLScore. This will apply the credit in the last section of pseudocode below when the check is made to determine whether the flow is violating good L4S queue use behavior.

When a flow burst from a sender is experienced at a network node for the first time, there may be no indication in memory of previous selective request for use of the low latency queue by the sender. Thus, performance is likely to suffer in its initial burst as the data flow associated with the sender may not receive any "credit." In an embodiment, the sender may indicate its selective use of the L4S resource by using a specific (currently unused) bit pattern, for example, in the 6-bit Differential Services (Diffserv) field of the IP Header of packets of its data flow.

In a related vein, in another implementation, an application may indicate to the ISP via an API call that it uses selective L4S enablement. For example, this may be implemented in a Network-as-a-Service (NaaS) architecture by an ISP.

In yet another implementation that addresses the issue of the debut of a sender's flow at a receiving node, the ISP may identify the application flow type (and therefore its characteristic of selectively using L4S) using methods such as source IP/source port inspection, traffic distribution, Deep Packet Inspection (DPI), or the like, so that it can recognize that the flow is likely to use selective L4S. Machine learning techniques may be used to classify the data flow based on such and related data. In this case, a default value selective may be used in the initial burst.

It is also contemplated that a credit generated by a data flow of one sender application may be applied to benefit a data flow of another sender application. For example, in some embodiments, an application provider may have a plurality of flows to a specific end user. Each flow may be identified by its 5-tuple. It is possible that more than one application is running between a source and a destination IP (even if port numbers and protocol fields are different). This could occur, for example, if a server is providing cloud gaming service and another service such as chat/messenger. In such situations, a network service provider may transfer the credits of one flow to another flow. For example, the credits developed, say, when a voice call selectively uses L4S may be transferred to a data flow associated with cloud gaming. In this example, a burst in cloud gaming traffic may benefit from infrequent (selective) use of L4S by the voice chat. The network node may implement this by comparing the source and destination IP addresses of different flows that are active (based on the Macro Timer) at any time.

Figure 10:
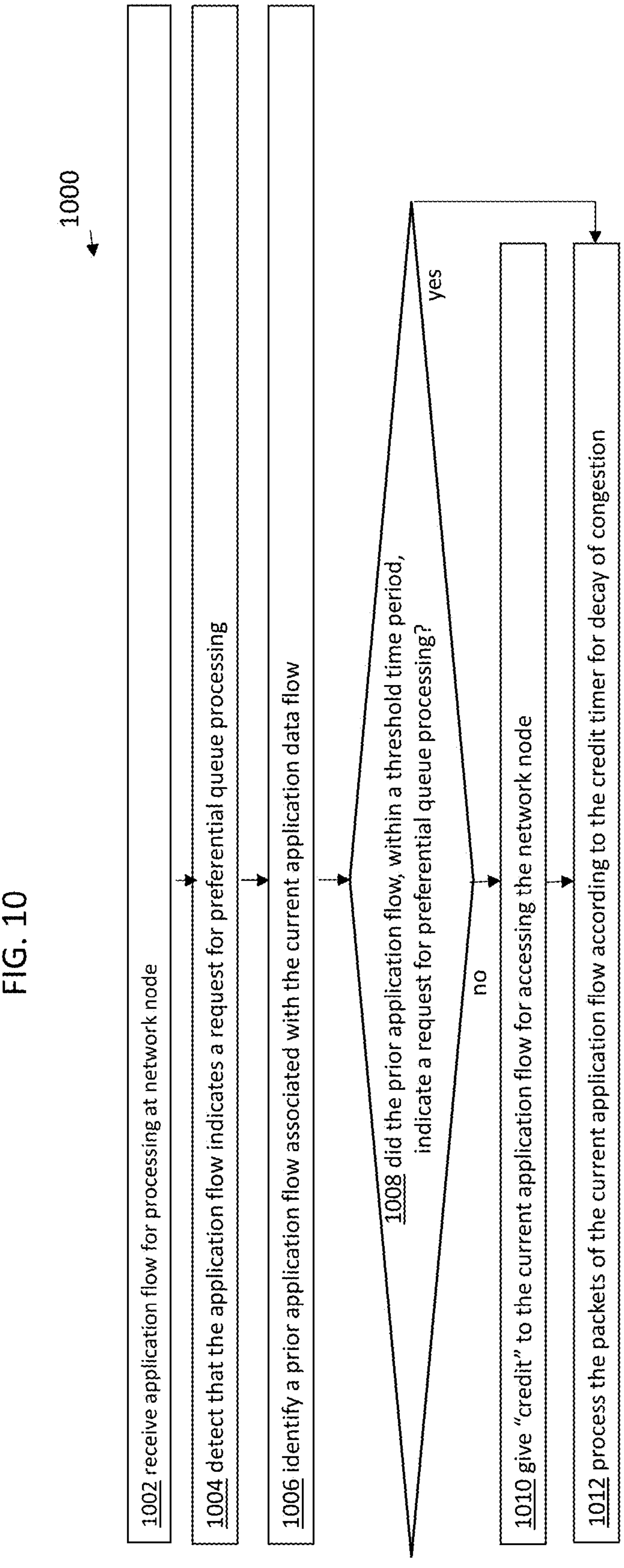
FIG. 10 is a flowchart showing processing in accordance with an aspect of some embodiments of the present disclosure.

FIG. 10 is a flowchart that shows the processing according to an aspect of the present disclosure. At 1002, application data flow from a sender, such as application 111, is received for processing at a network node. For example, the application flow may be associated with an application running on a server and the network node may be device 109 at which processing of the network traffic sent by the application 111 is requested. Queue assigner 101 may determine whether congestion exists at the network node 109 at which processing is requested. In an implementation, if no congestion is detected, then all data flows requesting preferential processing may be so processed, or the preferential queue may be ignored or not enabled at all because of a lack of data traffic.

Queue assigner 101 at 1004 may then determine whether the application flow indicates that processing at the L4S queue has been requested for the application flow. If so, then at 1006, the queue assigner 101 may retrieve from prior L4S queue request database 103 data regarding one or more prior data flows associated with the application associated with the application flow.

At 1008, the queue assigner 101 determines whether, within a threshold time period, a prior application data flow indicated a request for preferential queue processing. Queue assigner 101 may consult a database, such as prior L4S queue request database 103, that stores information for previously received network traffic for one or more senders. Such a database may keep track of the time for each application data flow received, whether the data flow requested preferential processing, the sender application associated with the data flow, the percentage or number of packets requesting such preferential processing in each data flow, and other statistical information about preferential queue processing requests. In an implementation, in addition, data regarding one or more prior data flows associated with a client device that has transmitted a server request to the sender application 111 may be retrieved. For example, a client device 212 shown in FIG. 2 may be a gaming device that requests data processing by a remote server; this remote server may be the sender 111 that sends data to the network node 109. In this implementation, data regarding preferential queue processing requests for network traffic flows requested by the client device 212 may be kept track of. For example, such data may be exchanged between various queue assigner devices of a network. Queue assigner 101 would then receive such data regarding preferential queue processing requests for network traffic flows requested by the client device 212 from another queue assigner on the network, and determine, accordingly, whether to award credit to the current data flow received from the sender 111. In addition, the database may also maintain a record of whether packets of each data flow were actually processed in accordance with the request, which is whether they were processed in a preferential queue.

In an embodiment, if the data packets of the prior application data flow were not actually added to the preferential queue pursuant to the request for preferential queue processing, then such a prior data flow would not be counted as having requested referential processing. That is, in this embodiment only if the prior application data flow that requested preferential queue processing was actually granted preferential queue processing would prevent getting credit for the current data flow of the sender.

In an implementation, in addition to, or instead of, giving a credit to a sender for prior data flows not requesting preferential processing, the sender of prior data flows that did request preferential processing may be penalized. For example, the time indicated by the congestion decay timer may be increased as a penalty for a sender associated with a prior data flow that did request preferential queue processing.

If at 1008 the queue assigner 101 determines that within a threshold time period the application has requested preferential queue processing for one or more prior data flows, then processing moves to 1012, where the packets of the current application data flow are processed according to the timer for decay. As discussed, the timer for decay may be a timer that decays, for example over a period measured in microseconds, the queueing score-a quantification of congestion at the network node. This queueing score may be an approximation or estimation for how long a current network congestion is estimated, or deemed, to last in view of the current traffic buildup. In this way, the probability that packets of the current data flow will be processed on the classic queue 113 are increased. In an implementation, if the determination at 1008 is "yes," then the request for preferential queue processing for the current packets may be ignored and the packets of the data flow may be processed on the classic cue without regard to the congestion decay timer.

On the other hand, if at 1008 it is determined that the application 111 has not requested, within a threshold period of time, preferential queue processing for one or more prior data flows associated with the sender 111, then at 1010, the application may be given credit for judicious use of the preferential queue, typically applied to the timer for expiry of flow state, The queue assigner 101 decreases the time indicated by a timer for decay of congestion. In this way, the probability that packets of the current application data flow will be processed on the preferential queue 115 are increased. In an implementation, if the determination at 1008 is "no," then the request for preferential queue processing for the current packets may granted and the packets of the data flow may be processed on the preferential queue without regard to the congestion decay timer. At 1012, the network traffic of this application flow may be processed according to the timer for expiry of flow state. In this way, it may be determined whether packets will receive preferential processing at the network node.

Figure 11:
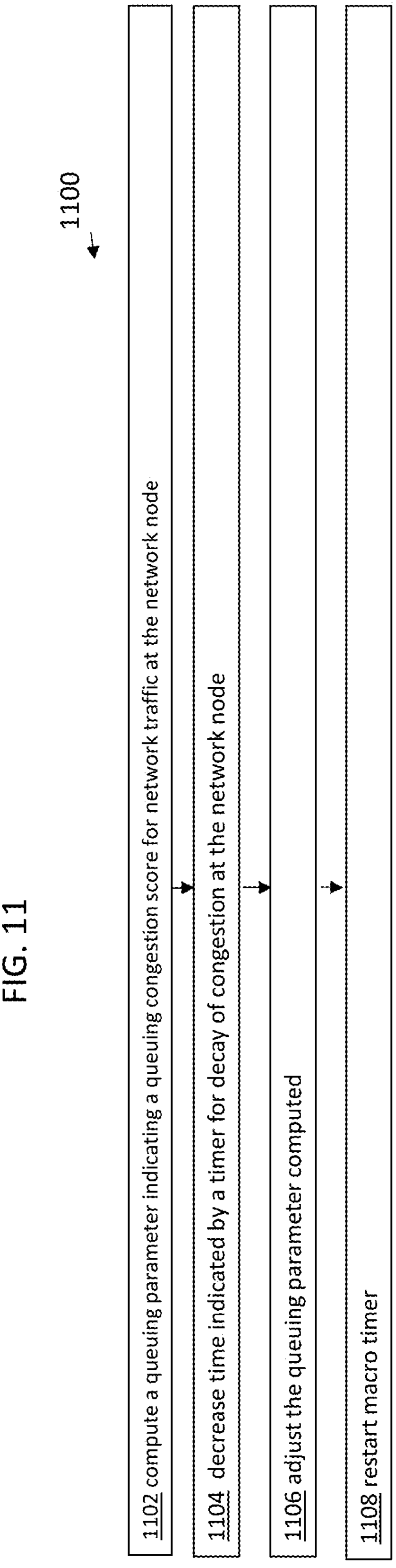
FIG. 11 is a flowchart that shows processing for providing credit for priority access to the preferential resource in accordance with an aspect of some embodiments of the present disclosure.

FIG. 11 is a flowchart that shows processing according to an aspect of the present disclosure for providing credit for priority access to the preferential resource (e.g., the l4S queue of a network node). At 1102, a queueing parameter may be computed for assessing or predicting network congestion at the network node that is or will be receiving the network traffic from the sender, such as application 111.

One or more of the operations shown as 1104, 1106 and 1108 may be conducted to implement the priority that the credit represents. At 1104, a timer that counts down to how much time is left until the queueing parameter is decayed. In an implementation, this timer may be decreased based on the quantity of the credit. As discussed, the quantity of credit awarded to the current application data flow may be based on the time period that elapsed since the sender application previously requested preferential processing (e.g., requested L4S queue for a previous data flow), the amount or percentage of a previous application data flow for which preferential processing was requested, the amount or percentage of a previous application data flow for which preferential processing was actually provided by the current network node, the amount or percentage of a previous application data flow for which preferential processing was actually provided by any network node, and the like, or a combination of the foregoing. Or the quantity of credit awarded to the current data flow may be a constant-either credit is awarded for past non-resource grabbing behavior or credit is not awarded.

Based on, or based in part on, the credit awarded, at 1106 the queueing parameter may be adjusted. For example, the queueing parameter may be decreased by about 35%-66%, or by about 15%-98%, based on the credit. As discussed, the quantity of credit awarded to the current application data flow may be based on a variety of factors.

Or, as shown at 1108, the macro timer for determining the time until the next data flow associated with the sender application may then be re-started.

FIG. 12 is a flowchart that shows processing according to an aspect of the present disclosure. At 1202, the application flow from a sender, such as application 111, is received for processing at a network node. For example, as discussed, the sender may be an application running on a server and the network node may be device 109 at which processing of the network traffic sent by the application 111 is requested. Queue assigner 101 may determine whether congestion exists at the network node 109 at which processing is requested. In an implementation, if no congestion is detected, then all data flows requesting preferential processing may be so processed, or the preferential queue may be ignored or not enabled at all because of a lack of data traffic.

Queue assigner 101 may identify at 1204 that the network traffic indicates that processing at the L4S queue has been requested for the network traffic. If so, then at 1206, the queue assigner 101 may retrieve, from prior L4S queue request database 103, data regarding one or more prior application data flows associated with the sender to identify a prior data flow associated with the sender.

At 1208, the queue assigner 101 determines whether the sender 111 has sent a prior application data flow that indicated a request for preferential queue processing. As discussed, this determination may be based on more than one previous data flow associated with the sending application. For example, it may be based on whether two or about 3-100 of the most recent data flows associated with the sending application have requested preferential processing. Or, it may be based on an the arithmetic mean, or median, of about 2-100 of the most recent data flows associated with the sending application have requested preferential processing. Queue assigner 101 may consult a database, such as prior L4S queue request database 103, that stores information for previously received network traffic for one or more senders. If yes, then normal L4S processing may continue at 1212.

On the other hand, if preferential processing has not been requested previously, or has not been requested for the number, mean or median of data flows, or for the number, mean or median of packets thereof, as discussed previously, then at 1210, the preferential processing requested may be selectively enabled. In an embodiment, the data packets would be granted access to the preferential queue. In another embodiment, priority (e.g., credits) would be given for accessing the preferential queue, as discussed herein.

FIG. 13 is a flowchart that shows processing according to an aspect of the present disclosure. At 1302, network traffic from a sender, such as application 111, is received for processing at a network node. Queue assigner 101 may identify that the flow indicates that processing at the L4S queue has been requested for the network traffic. If so, then at 1304, the queue assigner 101 may retrieve from prior L4S queue request database 103 data regarding one or more prior application data flows associated with the sender to identify a prior data flow associated with the sender. It may be determined that the sender has requested preferential processing for its prior application data flow, or that it has done so within a threshold period of time. Accordingly, its priority score would be maintained (e.g., it would receive no credit).

At 1306, another application data flow—the second application data flow—may be received from the sender. Queue assigner 101 may consult a database, and determine that this second application data flow indicates that processing at the L4S queue has not been requested. Accordingly, at 1308, sender's future data flow's priority score would be increased (e.g., it would receive credit).

At 1310, a third application data flow may be received from the sender, and it may be determined that this third application flow indicates that processing at the L4S queue is requested. It may be determined at 1312 whether, based on current network conditions, the third data flow would be denied preferential processing, or would be denied preferential processing for most of its packets, or for any of its packets. If so, then 1312, the priority score (e.g., credit awarded) at 1308 may be applied to the third data flow for priority access to the preferential resource (e.g., to grant access to the L4S queue or to increase the probability of access for the L4S queue). At 1314, the third data flow is processed according to the previous operation (e.g., with credit, as shown in 1312, or without credit, if 1312 is skipped).

One or more actions of the methods 600-1300 may be incorporated into or combined with one or more actions of any other process or embodiments described herein. These and other methods described herein, or portions thereof, may be saved to a memory or storage (e.g., of the systems shown in FIG. 5) or locally as one or more instructions or routines, which may be executed by any suitable device or system having access to the memory or storage to implement these methods.

In some embodiments, such preferential treatment may be selectively turned on and off based on determining whether to employ L4S (or not) for the portions of the data traffic. In an embodiment, the system of awarding credit for past good behavior of a sender may be selectively enabled or disabled.

In an embodiment, some applications' data flows may be granted the credit described above based on past behavior for use in a preferentially queue, while other applications' data flows may not be granted the credit based on similar past behavior. For example, network traffic identified as cloud gaming and in-home console/personal computer (PC) streaming to remote players, may be granted the granted credit selectively, as described above. While other applications that may be deemed less latency sensitive may never be granted credit. For example, system may determine that for cutscenes or a menu screen or advertisements of the video game, the second queue may be sufficient.

In a similar vein, some applications may be exempt from past behavior examination and always receive access to the L4S queue upon requesting it.

In some embodiments, L4S packet markings (or other preferential treatment) may be enabled during gameplay of portions of the game (e.g., determined by the game developer) such as, for example, when the player reaches a specific location within a level or during a boss fight. In some embodiments, the system and/or game engine may use pre-existing gaming metadata to determine when to signal the start of applying the L4S packet markings. In some embodiments, the metadata may be written to an XML file (or any other suitable file or data structure), and networking equipment or another suitable device may read that file and/or send or receive such file via an API. For example, a game engine may make an API call to "enable or disable" priority or preferential treatment (e.g., L4S and/or another suitable mechanism) for a particular portion of traffic. Similarly, the method of awarding credit based on past behavior may be selectively enabled or disabled based on such metadata.

In some embodiments, the system may perform audio and/or visual analysis in real time and/or any other suitable analysis to identify what type of scene is being played in the video game. In some embodiments, such analysis and/or metadata may indicate to the system whether a portion of the session data is latency sensitive (or not). For example, in a cloud gaming session, combat gameplay may be considered latency sensitive, while a cutscene, or an advertisement, or levels of the game where the user is just exploring a map, for example, may not be latency sensitive. As another example, in a football video game, plays during the game (e.g., a field goal or extra point being kicked, or a play from the line of scrimmage) may be considered latency sensitive, but a time after the play, or a time when a coach or fans are shown in gaps between plays, may not be considered latency sensitive. Similarly, the method of awarding credit based on past behavior may be selectively enabled or disabled based on such metadata.

The term "and/or," may be understood to mean "either or both" of the elements thus indicated. Additional elements may optionally be present unless excluded by the context. Terms such as "first," "second," "third" in the claims referring to a structure, module or step should not necessarily be construed to mean precedence or temporal order but are generally intended to distinguish between claim elements.

Terminology used herein is for the purpose of describing particular embodiments only and is not intended to be limiting of the disclosure.

Throughout the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises."

Throughout the specification the phrases "in response to" and "based on" shall be understood to have a broad meaning unless context requires otherwise. For example, "in response to" can refer to a step that is in direct or indirect response to a prior step, and "based on" can refer to a step that is based at least in part on a prior step.

As used herein, the terms "real time," "simultaneous," "substantially on-demand," and the like are understood to be nearly instantaneous but may include delay due to practical limits of the system. Such delays may be in the order of milliseconds or microseconds, depending on the application and nature of the processing. Relatively longer delays (e.g., greater than a millisecond) may result due to communication or processing delays, particularly in remote and cloud-computing environments.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although at least some embodiments are described as using a plurality of units or modules to perform a process or processes, it is understood that the process or processes may also be performed by one or a plurality of units or modules. Additionally, it is understood that the term controller/control unit may refer to a hardware device that includes a memory and a processor. The memory may be configured to store the units or the modules, and the processor may be specifically configured to execute said units or modules to perform one or more processes which are described herein.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The use of the terms "first", "second", "third", and so on, herein, are provided to identify structures or operations, without describing an order of structures or operations, and, to the extent the structures or operations are used in an embodiment, the structures may be provided or the operations may be executed in a different order from the stated order unless a specific order is definitely specified in the context.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory (e.g., a non-transitory, computer-readable medium accessible by an application via control or processing circuitry from storage) including, but not limited to, volatile and non-volatile computer memory or storage devices such as a hard disk, floppy disk, USB drive, DVD, CD, media cards, register memory, processor caches, random-access memory (RAM), UltraRAM, cloud-based storage, and the like.

The interfaces, processes, and analysis described may, in some embodiments, be performed by an application. The application may be loaded directly onto each device of any of the systems described or may be stored in a remote server or any memory and processing circuitry accessible to each device in the system. The generation of interfaces and analysis there-behind may be performed at a receiving device, a sending device, or some device or processor therebetween.

Any use of a phrase such as "in some embodiments" or the like with reference to a feature is not intended to link the feature to another feature described using the same or a similar phrase. Any and all embodiments disclosed herein are combinable or separately practiced as appropriate. Absence of the phrase "in some embodiments" does not infer that the feature is necessary. Inclusion of the phrase "in some embodiments" does not infer that the feature is not applicable to other embodiments or even all embodiments.

The above-described embodiments are intended to be examples only. Components or processes described as separate may be combined or combined in ways other than as described, and components or processes described as being together or as integrated may be provided separately. Steps or processes described as being performed in a particular order may be re-ordered or recombined. In addition, the systems and methods described herein may be performed in real time.

Features and limitations described in any one embodiment may be applied to any other embodiment herein, and flowcharts or examples relating to one embodiment may be combined with any other embodiment in a suitable manner, done in different orders, or done in parallel. Features or operations described in any one embodiment may be applied to any other embodiment herein.

The systems, methods, and processes described herein are intended to be illustrative and not limiting. One skilled in the art would appreciate that the actions of the processes discussed herein may be omitted, modified, combined, duplicated, rearranged, and/or substituted, and any additional actions may be performed without departing from the scope of the invention. More generally, the disclosure herein is meant to provide examples and is not limiting. Only the claims that follow are meant to set bounds as to what the present disclosure includes.

Furthermore, it should be noted that the features and limitations described in any one embodiment may be applied to any other embodiment herein, and flowcharts or examples relating to one embodiment may be combined with any other embodiment in a suitable manner, done in different orders, or done in parallel. Features or operations described in any one embodiment may be applied to any other embodiment herein. The systems and methods described herein may be performed in real time.

The systems and/or methods described above may be applied to, or used in accordance with, other systems and/or methods. In various embodiments, additional elements may be included, some elements may be removed, and/or elements may be arranged differently from what is shown. Alterations, modifications and variations can be affected to the particular embodiments by those of skill in the art without departing from the scope of the present application, which is defined solely by the claims appended hereto.

This description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A computer-implemented method comprising:

detecting a characteristic of current network traffic transmitted by an application, wherein the characteristic indicates a request for processing via a preferential queue;

identifying a prior network traffic transmission profile of the application;

based at least on the prior network traffic transmission profile of the application, determining that the application has not, within a threshold time period, previously transmitted prior network traffic that indicated a prior request for the processing via the preferential queue; and based at least on the determining that the application has not, within the threshold time period, previously transmitted the prior network traffic that indicated the prior request for the processing via the preferential queue, providing a credit for the current network traffic for accessing a device using the preferential queue.

2. The method of claim 1, further comprising:

computing a queueing parameter indicating a queue congestion for processing by the device, wherein the providing the credit for the current network traffic for the accessing the device using the preferential queue comprises adjusting the queueing parameter to enable providing the current network traffic to the device using the preferential queue.

3. The method of claim 2, wherein the queueing parameter comprises a queueing score calculated based at least in part on combining a rate of flow of traffic provided to the device via a network and a level of congestion for processing by the device, and the adjusting the queueing parameter comprises changing a decay time of the queueing score.

4. The method of claim 1, further comprising:

computing a queueing parameter indicating congestion for processing by the device, and wherein the providing the credit for the current network traffic for the accessing the device using the preferential queue comprises awarding an amount of credit according to a quantity or percentage of the previously transmitted prior network traffic that indicated the request for the processing via the preferential queue.

5. The method of claim 1, wherein the preferential queue is a Low Latency, Low Loss, and Scalable Throughput queue, and the current network traffic transmitted by the application is a data flow, and wherein the detecting the characteristic of the current network traffic transmitted by the application comprises accessing an explicit congestion notification control bit of packets of the data flow.

6. The method of claim 1, wherein the determining that the application has not, within the threshold time period, previously transmitted prior network traffic that indicated the prior request for the processing via the preferential queue is performed by a queue assigner; and wherein the queue assigner is at one of a cable modem termination system or a cable modem.

7. The method of claim 1, wherein the current network traffic transmitted by the application comprises video data.

8. The method of claim 1, wherein the current network traffic transmitted by the application comprises game rendering data.

9. The method of claim 1, wherein the current network traffic transmitted by the application comprises SLAM video and Inertial Measurement Unit data.

10. A system comprising:

a memory; and processing circuitry configured:

to detect a characteristic of current network traffic transmitted by an application, wherein the characteristic indicates a request for processing via a preferential queue;

to identify, based at least on accessing the memory, a prior network traffic transmission profile of the application;

based at least on the prior network traffic transmission profile of the application, to determine that the application has not, within a threshold time period, previously transmitted prior network traffic that indicated a prior request for the processing via the preferential queue; and based at least on the determining that the application has not, within the threshold time period, previously transmitted the prior network traffic that indicated the prior request for the processing via the preferential queue, to provide a credit for the current network traffic for accessing a device using the preferential queue.

11. The system of claim 10, wherein the system is configured:

to compute a queueing parameter indicating a queue congestion for processing by the device, wherein the providing the credit for the current network traffic for the accessing the device using the preferential queue comprises adjusting the queueing parameter to enable providing the current network traffic to the device using the preferential queue.

12. The system of claim 11, wherein the queueing parameter comprises a queueing score calculated based at least in part on combining a rate of flow of the network traffic provided to the device via a network and a level of congestion for processing by the device, and the adjusting the queueing parameter comprises changing a decay time of the queueing score.

13. The system of claim 10, wherein the system is configured:

to compute a queueing parameter indicating congestion for processing by the device, and wherein the providing the credit for the current network traffic for the accessing the device using the preferential queue comprises awarding an amount of credit according to a quantity or percentage of the previously transmitted prior network traffic that indicated the request for the processing via the preferential queue.

14. The system of claim 10, wherein the preferential queue is a Low Latency, Low Loss, and Scalable Throughput queue, and the current network traffic transmitted by the application is a data flow, and wherein the detecting the characteristic of the current network traffic transmitted by the application comprises accessing an explicit congestion notification control bit of packets of the data flow.

15. The system of claim 10, wherein the determining that the application has not, within the threshold time period, previously transmitted prior network traffic that indicated the prior request for the processing via the preferential queue is performed by a queue assigner; and wherein the queue assigner is at one of a cable modem termination system or a cable modem.

16. The system of claim 10, wherein the current network traffic transmitted by the application comprises video data.

17. The system of claim 10, wherein the current network traffic transmitted by the application comprises game rendering data.

* * * * *